United States Patent [19]
Pettee et al.

[11] 3,797,173
[45] Mar. 19, 1974

[54] WORK HOLDING, POSITIONING, AND FEEDING MECHANISM

[75] Inventors: George H. Pettee, Sterling; Edward R. Blake, Worcester, both of Mass.

[73] Assignee: Norton Company, Worcester, Mass.

[22] Filed: Nov. 1, 1971

[21] Appl. No.: 194,578

Related U.S. Application Data

[63] Continuation of Ser. No. 59,433, July 30, 1970, abandoned.

[52] U.S. Cl. .................. 51/3, 51/98.5, 51/216 T, 269/71
[51] Int. Cl. .................................................. B24b 7/00
[58] Field of Search ........ 51/3, 98.5, 216, 232, 237; 269/71

[56] References Cited
UNITED STATES PATENTS

| | | | |
|---|---|---|---|
| 3,151,424 | 10/1964 | Ranelli | 51/232 |
| 835,320 | 11/1906 | Pomeroy | 51/237 |
| 3,058,267 | 10/1962 | Read | 51/216 X |
| 3,492,895 | 2/1970 | Greylock | 51/216 X |
| 1,509,904 | 9/1924 | Salisbury | 51/95 |
| 693,912 | 2/1902 | Sellmayer | 51/232 |

*Primary Examiner*—Harold D. Whitehead
*Attorney, Agent, or Firm*—Walter Fred

[57] ABSTRACT

A semi-automatic programmed cam controlled fluid actuated mechanism which holds, sequencially positions and pressure feeds various portions of rough workpieces such as, foundry castings, and forgings into a multi-pointed cutting tool of a machine tool for snagging gates, risers, sprues and other unwanted material therefrom. The mechanism is adapted to be fixed adjacent the cutting tool of a machine and can move the workpiece in a number of different directions about a plurality of axes to perform the necessary operations in any desired preselected programmed sequence. Workholders designed for each specific casting can be interchangeably mounted on the work support. Control means comprising programmable stepping switches, with numerous contacts and easily adjustable cams actuating fixed limit switches are provided to actuate various fluid directional valves, fluid motors, and movable components in the proper sequence and directions to produce the desired motions.

22 Claims, 9 Drawing Figures

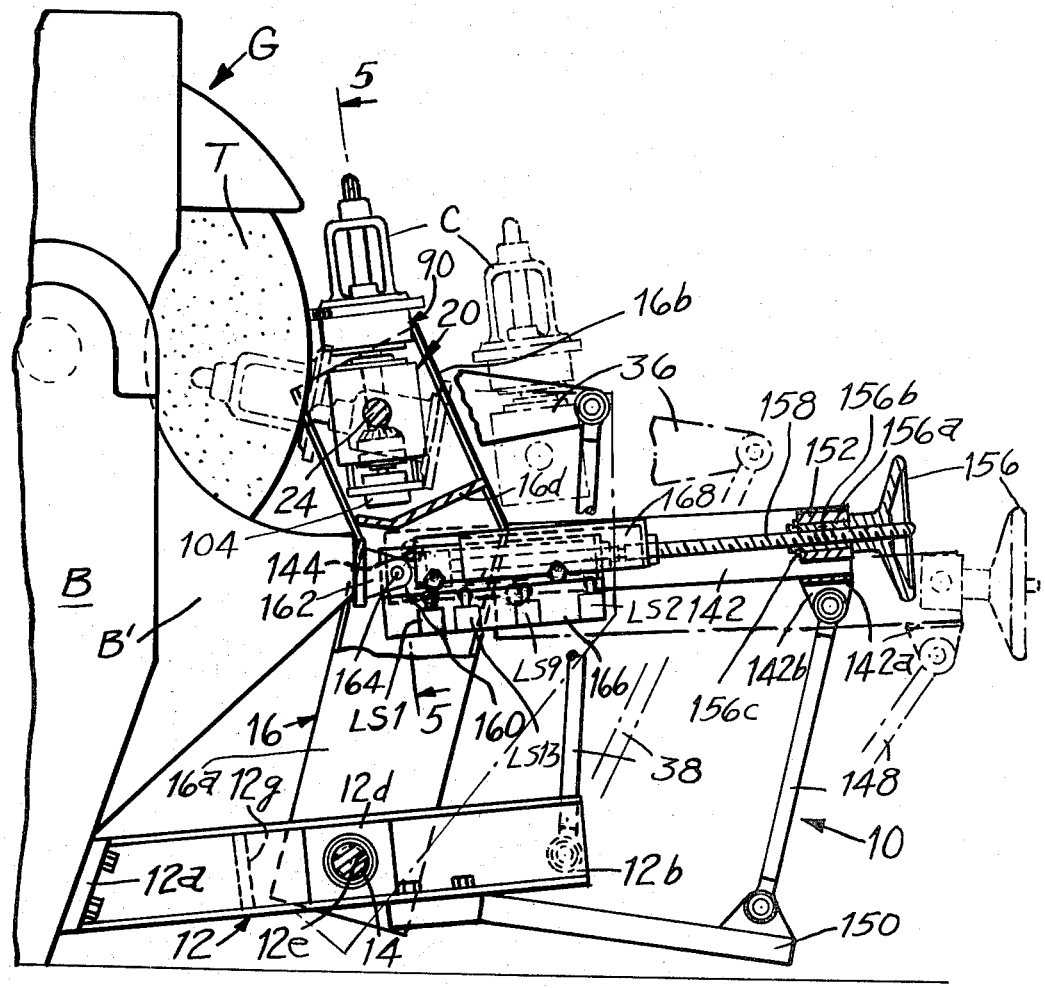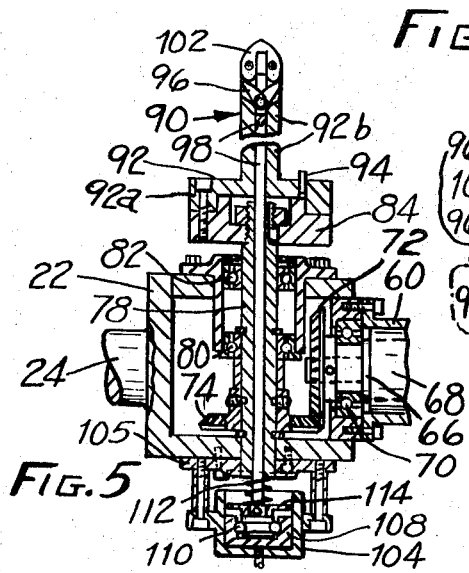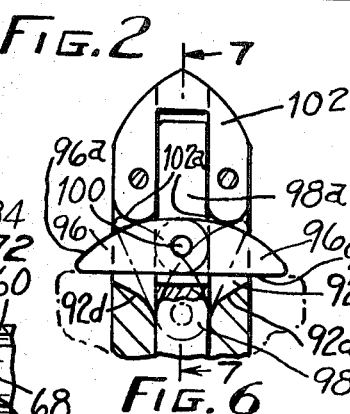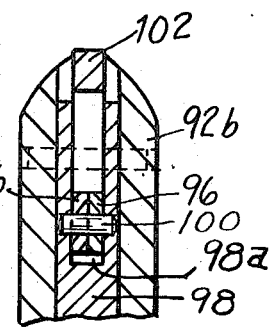

WORK HOLDING, POSITIONING, AND FEEDING MECHANISM

CROSS REFERENCE TO RELATED APPLICATIONS

This is a continuation of application Ser. No. 59,433 filed July 30, 1970, now abandoned.

BACKGROUND OF THE INVENTION

1. Field of Invention

The invention relates to snagging off unwanted material from rough castings. Particularly it concerns a mechanism adapted to hold and which automatically positions and feeds various portions of a casting in a programmed sequence into a driven multi-point cutting tool, such as, the abrasive wheel or belt of a snagging grinder.

2. Description of the Prior Art

In the past, it has been the custom to remove gates, risers, sprues and other unwanted material from castings by having a worker manually hold, position, and feed those portions of the casting to be removed into the cutting tool. Also, there exists devices with pressure bars and fluid cylinders for assisting the worker or operator to feed the castings into the cutting tool such as the abrasive snagging wheel or belt of a typical floor stand grinder. However, these devices still required manual positioning of the different portions of the casting thereon in relation to the cutting tool. There is also shown in U. S. Pat. Nos. 693,912, 835,320, 1,509,904 and 3,151,434 various work holders for polishing and buffing machines. Generally those work holders are movable in but two directions to position the workpiece and continuously rotate and/or reciprocate and hold substantially accurately machined regular circular shaped workpieces relative to the wheel. In contrast the applicant's mechanism can hold, position and feed various portions of regular and irregular shaped unmachined workpieces, castings, and forgings with rough inaccurate locating or reference surfaces thereon.

Further, the prior art discloses many types of non-analagous numerically controlled precision machine tools with components movable about numerous axes. The precision built into these machines are not required for rough snagging operations on castings and the extremely high cost can not be tolerated by the foundry industry. Recently however the foundries have been unable to attract a sufficient number of workers to do the strenuous manual work. Therefore, this useful inexpensive invention fulfills a need within the economics of the industry, and which is helpful to both the workers and the industry.

SUMMARY OF THE INVENTION

A base or support frame is adapted to be fixed to and supported on or adjacent a machine with a driven multi-point cutting tool. A carriage is pivotably and slidably mounted on the base frame and comprises an elongated support shaft slidably mounted in the support frame about a horizontal longitudinal axis substantially parallel to the axis of rotation of means supporting the cutting tool in the machine. A pair of spaced upwardly extending lever arms each have a lower portion pivotally mounted to an opposite end portion of the support shaft, and spaced upper end portions opposite the multi-point cutting tool. A fluid operated cylinder fixed to the support frame traverses the shaft and the lever arms parallel to the axis of rotation of the cutting tool support means. Adjustable cams movable with the lever arms actuate fixed limit switches to control the extent of movement in opposite directions and to initiate subsequent movements.

A work support head is pivotally mounted between the upper end portions of the lever arms for rotary movement about a pivot axis substantially parallel to the support shaft and the axis of rotation of the cutting tool. Movable with and relative to the work support head is a work holder rotatably mounted on the work support head for rotation about an axis normal to the pivot axis. A fluid cylinder for actuating the work holder is fixedly attached to the work support head. A rotatable drive shaft extends axially along the pivot axis from one side of the work support head and has gear teeth thereon engaging a lock pin lever arm mounted thereon. About the drive shaft, adjacent the lock pin arm, is a torque arm with a short lever arm extending to the end of lock pin arm. A fluid actuated tapered aligning lock pin extends through aligned tapered holes in both of the arms. A fluid operated lock pin actuating and deactuating cylinder and a rotary actuator to rotate the drive shaft is fixed to the torque arm having a long lever arm extending opposite the short lever arm. The long lever arm is attached to a ball joint at an upper end of a tie bar or rod having a ball joint at its opposite lower end attached to the base or support frame whereby a first four bar parallel linkage system is provided to maintain a definite relationship between the workpiece and the cutting tool when the lever arm together with the work support head are pivoted in a fixed arc about the axis of the support shaft.

The rotary actuator comprises a fluid actuated rack piston engaging a gear fixed to the drive shaft and pivots the lock pin arm, the work support head, and other components attached thereto when the lock pin is withdrawn. A cam support disc is keyed to the drive shaft and has adjustable cams thereon to engage fixed limit switches controlling the extent of pivotal movement and initiating the next operation.

Fixed in axial alignment with the drive shaft and on the opposite side of the work support head is a hollow driven shaft fixed to one rotatable drive member of a fluid actuated clutch. The one drive member is fixed to a support sleeve to which is fixed a fluid actuated rotary motor body. Axially aligned drive shafts extend from both ends of the rotary motor. One of the shafts is fixed to a second rotatable drive member of the fluid operated clutch keyed to an internal rotary drive shaft extending back through the hollow drive shaft to a bevel gear within the work support head. An axially movable clutch member is shifted by fluid pressure to couple the first and second drive members and thereby causes the work head, the clutch, and the rotary fluid motor to pivot together when the rotary actuator is energized. Upon releasing the fluid pressure in the clutch and actuating the lock pin cylinder, the work support head is fixed against pivotal movement and the rotary motor can be actuated to rotate the internal drive shaft relative to the hollow shaft. The bevel gear rotates and engages another bevel gear fixed to a shaft attached to the work holder, whereby the work holder is rotated about an axis normal to the pivot axis of the work support head.

On the carriage is a link bar pivotally mounted at one end between the upper and lower ends of each of the lever arms. The link bars extend forwardly away from the machine tool substantially parallel to one another and are pivotally connected to opposite ends of a pivotable cross feed bar or link having an elongated slot between the opposite ends thereof. The end of a fluid pressure work feed cylinder is pivotally attached to the fixed base, support frame, or a pivot support on or adjacent the machine tool and extends longitudinally with the axis of the piston rod therein normal to and pivotal about a horizontal axis substantially parallel to the axis of the traversable support shaft. An adjustably feed screw is fixed to the end of the piston rod and extends into engagement with a rotatable nut or hand wheel fixed against axial movement within the elongated slot in the cross feed bar.

A second tie rod with ball joints at opposite ends connects the base frame with a cross member fixed to the forward ends of the link bars whereby a four bar linkage system is provided to approximately maintain the force relationship between the fluid pressure cross feed cylinder force and the cutting tool when the carriage is rocked towards and away from the cutting tool. A cam support including a plurality of adjustable cams moves with the carriage and engages limit switches to control the extent of movement toward and away from the cutting tool and also starts a subsequent movement.

The work holder for each casting has a support base against which the casting is clamped and designed to be interchangeable and mate with a universal mounting plate fixed to a rotatable shaft.

A plurality of conventional programmable stepping switches have a plurality of contacts adapted to close and open at the proper time connected in series with the various limit switches. The limit switches upon being actuated energize the stepping motors in unison whereupon some contacts are programmed to close and energize solenoid operated fluid directional flow control valves in the proper sequence. Others are programmed to open and de-energize or prevent energization of solenoid operated fluid directional valves in the proper sequence. The energization and de-energization of the solenoid operated directional valves directs fluid under pressure to the various components which hold position and feed various portions of the casting into the cutting tool in the proper sequence.

It is therefore the primary object of this invention to provide an economical work holding, positioning, and feeding mechanism, with simple, easily adjustable, readjustable, and programmable control means for automatically, sequencially positioning and pressure feeding different unwanted portions of rough workpieces properly into, and for removal by, a driven multi-point cutting tool of a machine tool situated adjacent the mechanism.

BRIEF DESCRIPTION OF THE DRAWINGS

FIG. 2, is a side view in elevation, partly in section of the work holding, positioning, and feeding mechanism of the invention shown by way of example only attached to the base of the snagging grinder shown in FIG. 1;

FIG. 5, is sectional view taken, approximately on line 5 — 5 of FIG. 2, through a portion of the work support head and a work holder supported thereon for holding a specific casting shown by way of example only;

FIG. 6, is an enlarged sectional view of the upper end of the work holder showing the collapsed and expanded positions of the pivotable clamping members and the camming surfaces therein;

FIG. 7, is sectional view taken on line 7 — 7 of FIG. 6;

DESCRIPTION OF THE PREFERRED EMBODIMENT(S)

Figure 1:
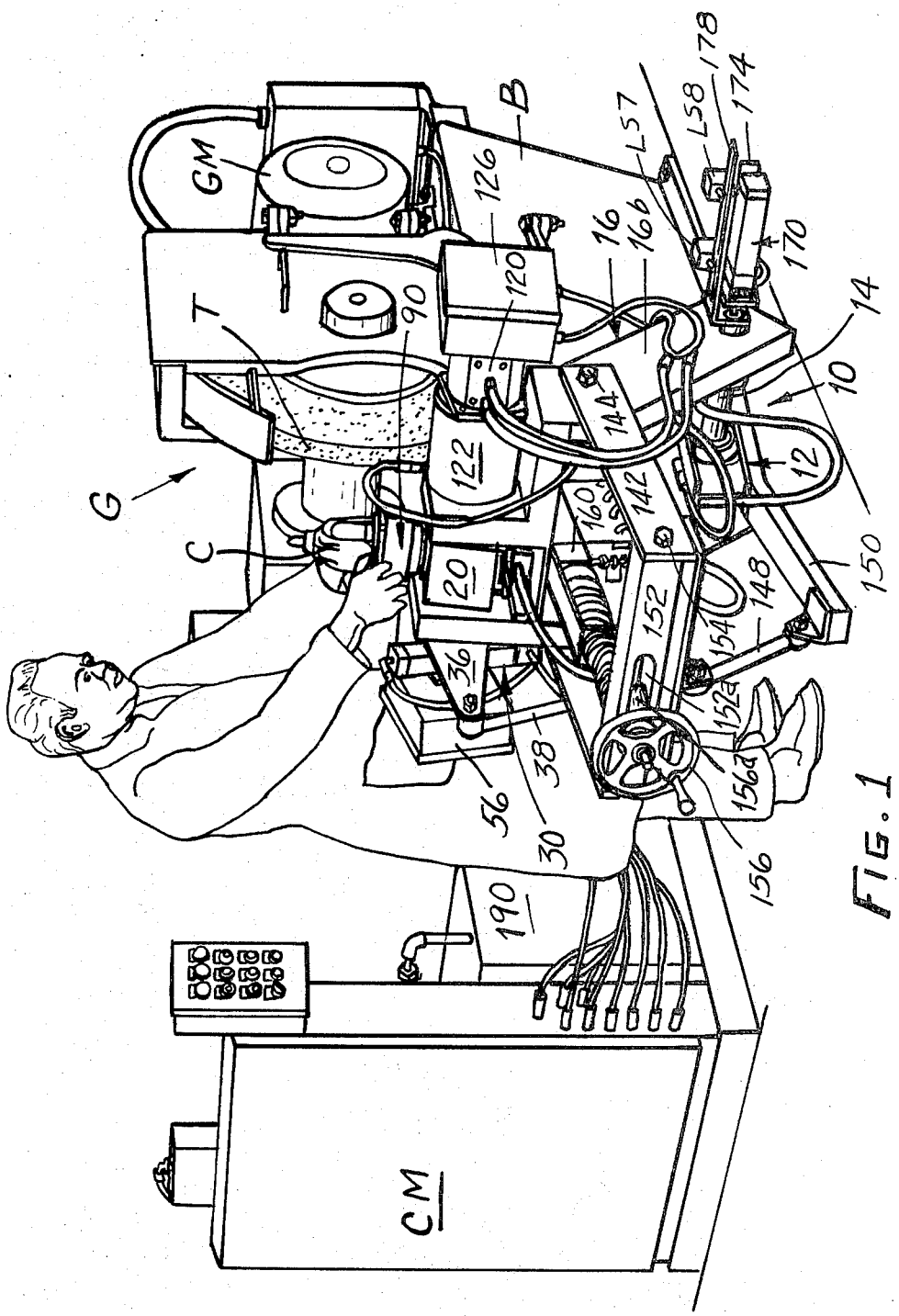
FIG. 1, is a perspective view of the work holding, positioning and feeding mechanism of this invention associated with a floor stand snagging grinder, shown by way of example only as one of the many types of machines with a driven multi-point cutting tool with which the invention may be utilized.

The invention will be described by way of the example only in association with a conventional floor stand type grinder G for snagging material off foundry castings as shown in the drawings. The grinder G has a multi-point cutting tool or grinding wheel T rotatably supported and driven in the well known manner about its axis of rotation by a conventional drive motor GM on a base B of the grinder. However, other types of machines maybe used in combination with the invention and which have multi-point cutting tools such as abrasive belts, milling cutters, fly cutters and and the like moving around the axis of rotation of means supporting the multi-point cutting tool to remove the unwanted material from the rough castings. An example of a typical casting of which is indicated by the letter C.

Referring to the drawings there is shown a work or workpiece holding, positioning, and feeding mechanism 10 with which this invention is concerned situated adjacent the cutting tool and front side of the grinder G. The mechanism 10 comprises a base frame or support frame 12 which is fixed relative to and in this instance to the base B of the grinder G. However, the support frame could be substituted by a pedestal or base fixed to the floor and relative to the machine base B. The support frame 12 comprises a base plate 12a fixed, as by bolting, to the base B of the grinder G extending outwardly and away from the front of the machine. Fixed at one end to the base plate are a pair of spaced support members or I beams 12b and 12c. Each of the I beams have a bearing block 12d fixed thereto intermediate the opposite ends thereof with axially aligned cylinderical bearing holes 12e therein. The axis of the bearing holes 12e is substantially horizontal and parallel to the axis of rotation of the grinding wheel or cutting tool T. A reinforcing tie bar 12g extends between and is fixed to the I beams and to an outboard support member or bar 12h fixed at one end to the base plate 12a and extends outwardly therefrom to the right side of I beam 12c, as viewed in FIG. 3 and FIG. 4, to an unsupported end fixed to a traversing cylinder support plate or member 12j.

An elongated support shaft 14 extends through the aligned bearing holes 12e and with its opposite ends extending beyond the I beams 12b and 12c. The shaft 14 being pivotable about and slidable axially along its longitudinal axis relative to the base or support frame 12, the cutting tool, and the snagging machine or grinder G.

Attached to, slidable with, and either pivotal with or relative to the shaft is a carriage 16 which may include the support shaft 14 comprising a pair of upwardly extending spaced lever or rock arms 16a and 16b constructed in this instance from structural U-shaped channel iron.

The lower end portions of the lever arms have axially aligned cylinderical bearings 16c therein through bearing holes of which the shaft 14 extends. There are conventional retaining or snap rings 16d adjacent opposite ends of the bearings 16c which snap into spaced grooves in the shaft to prevent relative axial motion therebetween. If desired means, such as, conventional pins or set screws could be used instead of or in addition to the snap rings to prevent relative axial motion between the shaft and the lever arms. Alternatively, the support shaft 14 could be fixed to the I beams 12b and 12c and relative to the base frame 12. The carriage 16 could then pivot and slide axially relative to the shaft.

As shown the lever arm 16a is supported on a portion of the shaft 14 between the I beams 12b and 12c and the lever arm 16b on a portion of the shaft between I beam 12c and the cylinder support plate 12j. In FIG. 2 it can be seen that the upper end portions of the rock or lever arms are aligned axially and situated at an angle of approximately 45° relative to their lower portions. A tie plate or connecting web 16d extends between the upper portion and fixes the relationship between the lever arms so they move together in unison.

Figure 3:
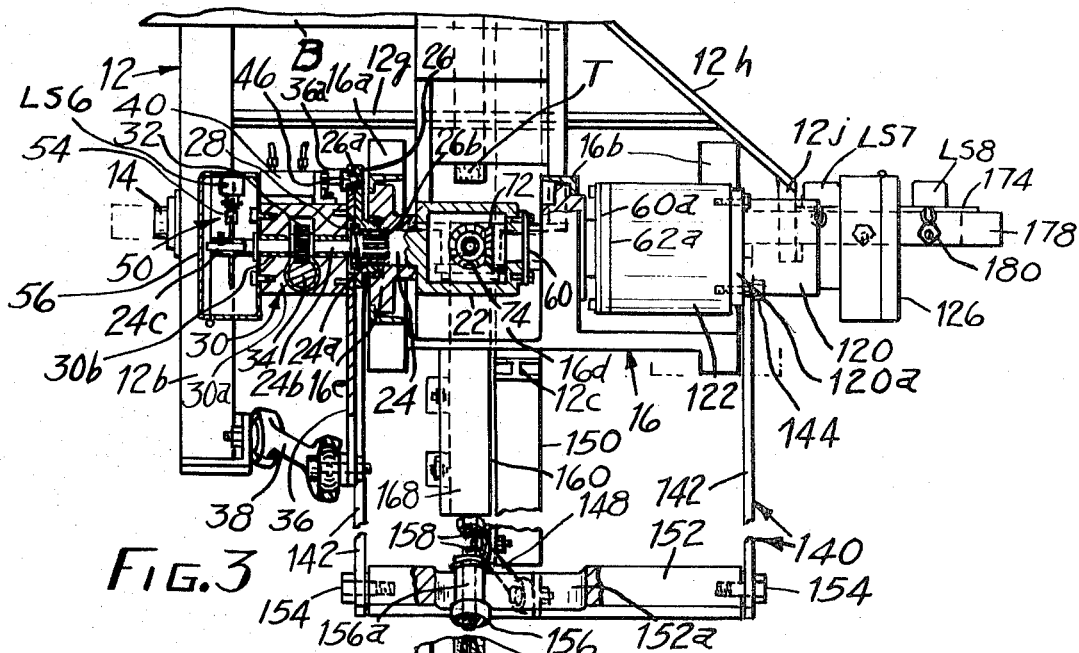
FIG. 3, is a plan view, shown partly in section of the invention shown in FIG. 2.
Figure 4:
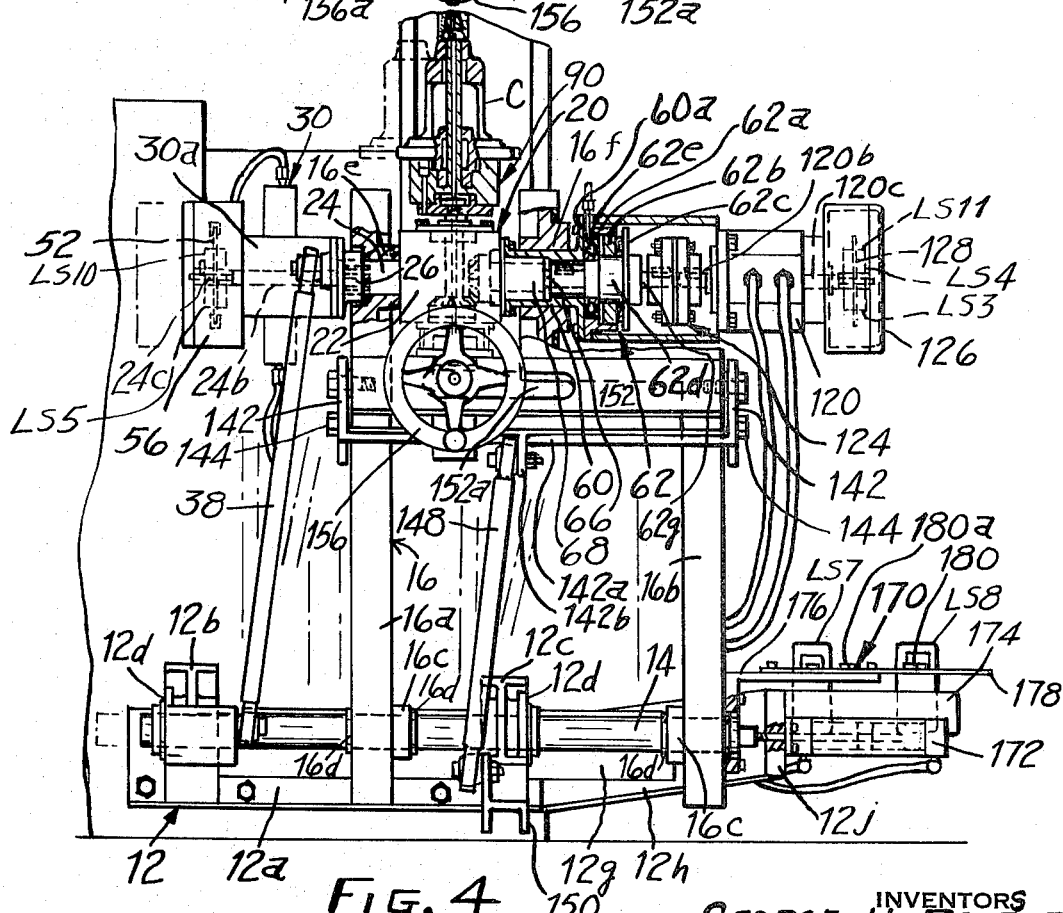
FIG. 4, is a front view in elevation with portions shown in section of the invention shown in FIG. 3.

As viewed in FIG. 2 and 3 the upper and lower portions of lever arm 16a are located in one plane whereas the upper and lower portions of lever arm 16b are offset and in different planes. The upper portions being axially spaced closer together than their lower portions.

In the upper angled portions of the lever arms 16a and 16b are axially aligned cylinderical support bearings 16e and 16f with axially aligned bearing holes in which is pivotally mounted and supported work support means or a work support head 20 for movement about a pivot axis substantially parallel to and movable relative to the longitudinal axis of the support shaft 14 and the axis of rotation of the cutting tool T.

The work support means or head 20 comprises a work holder support or gear housing 22 which in this instance is a substantially hollow, flat sided, cube shaped structure. A rotatable or pivotal drive shaft 24 is fixed to and extends from the left side of the housing 22 and passes through the support bearing 16e in lever arm 16a. The drive shaft 24 has a spline or gear tooth 24a on the large diameter portion thereof extending beyond the bearing 16e, a threaded portion, and adjoining reduced portions 24b and 24c of lesser diameter.

A lock pin lever arm or angular work positioning arm 26 has a tapere locating hole 26a spaced from a central hole 26b with internally formed mating spline or gear tooth meshing or engaged with the gear tooth 24a on the large diameter portion of the shaft 24. A threaded retainer nut 28 on the threaded portion maintains the lever arm 26 in position.

Means are provided for pivoting the work support head or means 20 relative to the carriage 16 and the cutting tool T about the pivot axis of the shaft 24 and the bearings 16e and 16f in the lever arms 16a and 16b comprising a conventional fluid operated rotary actuator 30 such as, Model 3720 - 1110 commercially available from Flo-Tork Division of Allen Electric And Equipment Company, Orrville, Ohio.

The rotary actuator 30 comprises a housing or body 30a with spaced aligned bearings 30b through axially aligned bearing holes of which the reduced portion 24b of the shaft 24 extends and supports the actuator 30. A gear 32 is fixed to the rotatable drive shaft portion 24b and meshes with the rack teeth of a transversely movable rack piston 34 slidably mounted in a cylinder bore in the body 30a of the actuator 30.

Fixed, as by bolting, to a side of the rotary actuator body 30a and adjacent the positioning arm 26 is a torque arm 36 having a short lever arm with a tapered hole 36a shown in axial alignment with the locating hole 26a. The torque arm 36 has a clearance hole through which the shaft portion 24b extends and from the axis of which a long lever arm extends opposite the short lever arm and away from the front of the machine. It is connected at its end portion to the upper ball joint at the upper end of a tie rod or bar 38. The tie rod 38 extends downwardly and has a lower ball joint at its opposite lower end connected to the forward unsupported end of the I beam 12b.

In FIG. 2 it can be seen that the relative positions of the axes of the ball joints and of the shafts 14 and 24 are always maintained at predetermined fixed distances apart by what is known conventionally as a four axes or four bar parallel linkage system. The four bar linkage system serves to maintain the initial predetermined angular position of the work support head 20 and the casting C thereon as shown in phantom lines in FIG. 2 as the carriage 16 is pivoted about the relatively stationary longitudinal axis of the support shaft 14 to feed the casting C into the cutting tool T.

The torque arm 36, the tie rod 38, and the I beam 12b serve to support and to resist the forces exerted in both directions by the fluid operated rotary actuator 30. In addition the ball joints at opposite ends of the tie bar 38 allow the cariage 16, together with the work support head 20 to be traversed predetermined limited amounts in opposite directions along the lingitudinal axis of the elongated support bar 14. As the carriage 16 is moved substantially parallel to the axis of rotation of the grinding wheel T the center distance between the ball joints of the tie rod 38 vary only slightly without substantially changing the initial relationship between the four bar parallel linkage system.

Means are provided for aligning and locking the torque arm 36 and the lock pin lever or angular positioning arm 26 together to prevent rotation of the work support head 20 by the rotary actuator 30 or machining forces. The aligning and locking means comprises a fluid actuated and deactuated lock pin cylinder 40, fixed, as by bolting to the backside of the body 30a on the rotary actuator 30. A piston 42 is slidably mounted within a cylinder bore in the cylinder 40 from which a piston rod 44 extends substantially parallel to the axis of the shaft 24 and in axial alignment with the aligned tapered locating holes 36a and 26a. Fixed to the end of the piston rod 44 is a conical locating pin or tapered lock pin 46 in mating engagement with and aligning the tapered holes 36a and 26a in the torque arm 36 and the lock pin lever arm 26.

Upon actuating the four way directional valve VD fluid under pressure is admitted into the left side of the cylinder bore and the piston forces the tapered lock pin 46 to the right to align and lock the lock pin lever or angular positioning arm 26 to the torque arm 36 and prevent relative movement therebetween. However, upon deactuating the valve VD and shifting the piston 42 to the left, only moves the tapered lock pin 46 out of the tapered hole 26a and clear of the lock pin lever arm 26. A portion of the tapered pin 46 remains within the tapered hole 36a in torque arm 36 which is fixed relative to the cylinder 40.

With the tapered locking pin 46 withdrawn, fluid under pressure can be admitted, by actuating a four way directional control valve VB, to either end of the bore in the rotary actuator 30 to move the piston 34 therein. Movement of the piston 34 causes the rack tooth thereon to rotate gear 32, the shaft 24, and hence pivot the work support head relative to the carriage 16 towards and away from the cutting tool or grinding wheel T.

Adjustable control means 50 are provided for limiting the amount of pivotal and angular movements of the work support head 20 and the casting C about the pivot axis of the drive shaft 24 towards and away from the cutting tool T and for initiating further work feeding and/or positioning movements of the mechanism 10. The adjustable control means 50 comprises a cam support disc 52 fixed to as by a set screw and rotatable with the portion 24c of the shaft 24. On the periphery of the disc 52 is fixed at predetermined spaced angular positions a plurality of adjustable cams 54, 54a and 54b. An enclosure or cabinet 56 with an access door is fixed to the left side of body 30a of the rotary actuator 30 and through a wall of which extends the shaft portion 24c situated within a chamber therein. A plurality of conventional limit switches LS5, LS6, and LS10 are fixed to the wall of the cabinet in a predetermined angular position about the pivot axial of the shaft portion 24c. Each of the limit switches being actuated by at least one or more of the cams 54 to sequentially stop a previous work feed or positioning movement and/or initiate another work feeding or positioning movement.

The work support head 20 has integrally formed therewith or fixed to the opposite or right hand side of the housing 22 a hollow rotatably driven shaft 60 extending through the support bearing 16f in axial alignment with the pivot axis of the pivotal drive shaft 24. The opposite end of the driven shaft 60 is fastened to a flange 60a fixed relative to a rotatable driven cylinder 62a of a conventional fluid operated clutch 62 such as Model LWB commercially available from Horton Manufacturing Company, Inc., Minneapolis, Minn. Slidably mounted within the driven cylinder 62a is an axially movable clutch drive piston or friction disc 62b keyed or splined, in the well known manner not shown, against rotation relative to the cylinder 62a. The clutch drive piston 62b is adapted to be forced by fluid under pressure into driving engagement with the other driven clutch member or disc 62c of the clutch 62. Upon actuating a two way directional control valve VE fluid under pressure is admitted into the cylinder 62a to force the drive piston 62b into engagement with and drive the disc 62c. Deactuating valve VE allows fluid to exhaust and disengage the drive piston 62b from the disc 62c. A cylinderical hub 62d integral with the disc 62c extends through the central bore of the drive piston 62b and has a anti-friction bearing 62e mounted on a portion thereof extending over and keyed to a rotatable driving gear drive shaft or internal drive shaft 66 extending through a sleeve 68 within the hollow driven shaft 60. The outer race of the bearing 62e rotates together with the hollow shaft 60, the cylinder 62a, and the piston 62b relative to the inner race rotatable with the hub 62d, the disc 62c, and the drive shaft 66. The internal drive shaft 66 has a end portion extending through and journalled in an antifrication bearing 70 fixed against axial movement in the right hand side wall of the work support housing 22. A driving gear or bevel gear 72 is fixed by suitable means, such as by pining or bolting it to the shaft 66, and is rotatably supported within the inner race of the bearing 70 in the housing 22. The bevel gear 72 meshes and drives a second bevel gear or work holder drive gear 74 fixed and keyed to a tubular rotatable work holder drive shaft 78 journalled in a pair of spaced antifriction bearings 80 and 82 in the housing 22. Drive shaft 78 extends longitudinally through the upper and lower walls of the housing 22 and is rotatable about a normal axis perpendicular to the pivot axis about which the pivotal drive shaft 24, the internal drive shaft 66, and the hollow driven shaft 60 rotate.

The bevel gears 72 and 74 are selected to have preferably a 1:1 ratio so that the shafts 66 and 78 rotate equal angular amounts about their individual axis.

Fixed and keyed to the upper end of the workholder drive shaft 78 is a workholder support base or adaptor 84 on which can be interchangeably mounted various workholders specifically designed to fit the base 84 and to hold the particular workpiece or casting C to be worked upon by the machine G.

In this instance the workholder 90 has a work support arbor 92 with a central hole and a work support or work drive flange 92a adapted to be bolted to and mate with the adaptor or workholder support base 84. Extending upwardly from and normal to the work support flange 92a is an elongated tubular work locating or aligning shaft or portion 92b of sufficient length to pass through spaced roughly aligned cast bores at opposite ends of the casting C. The casting C in this particular instance is a differential housing with a ring gear support flange from a peripheral portion of which must be removed excess cast material known as a gate. The housing has side walls extending axially from the support flange with large opposed access openings therein around which excess undesirable cast material, such a flash, is to be removed from each of the opposite roughly cast substantially flat parallel surfaces around the openings as shown in the drawings. The ring gear support flange of the casting C rests against the work support flange 92a and has a locating hole therein into which projects a combination work drive and work orienting or locating pin 94 fixed in the flange 92a. In the opposite upper pointed end portion of the tubular work locating shaft 92b is a transversely extending work clamp guide slot 92c at the bottom of which are work clamp retracting cam surfaces 92d on opposite side wall portions around the central hole through which the locating shaft 92b extends.

A pair of substantially identical work clamps or fingers 96 are pivotally mounted to the upper end portion of a work clamp actuating rod 98 slidable axially within the central bores of the tubular locating shaft 92b and the tubular workholder drive shaft 78.

The upper end portion of the actuating rod 98 also has a slot 98a aligned with and of substantially the same width as the transverse slot 92c. Within the slot 98a are situated beside one another, end portions of the work clamps 96 with aligned pivot holes through which extends a pivot pin 100 connected to the actuating rod 98. The work clamps or fingers 96 extend outwardly in opposite directions from the pivot pin 100 and each have end portions within the slots 92c with upper and lower cam following or engaging surfaces thereon. Within the slot 92c, adjacent the upper cam engaging surfaces of the work clamps 96, is a clamping cam 102 fixed as by conventionally bolting or pinning it to the opposite wall portions of the tubular work locating shaft 92b as shown. On the clamping cam 102 is a pair of spaced convex camming surfaces 102a each of which engages an upper convex cam engaging surface 96a on each of the work clamps or fingers 96. The lower cam engaging surfaces 96b on the work clamps 96 are substantially identical straight surfaces which in one position clamps against the end surface of the casting C and in another position engages the work clamp retracting cam surfaces 92d to release the workpiece or casting C.

Means including a fluid pressure operated work clamping cyinder 104 is provided for shifting the actuating rod 98 axially in opposite directions and thereby cam the work clamps 96 into and out of clamping engagement with the casting C. The cylinder 104 is fixedly attached to and spaced from a mounting plate 105 and the bottom wall of the housing 22 of the work support head 20, by conventional bolts and spacers shown. A piston 108 is slidably mounted within a cylinder bore in the cylinder 104 and rotatably mounted on an anti-friction bearing 110 having an inner race or hub fixedly attached to the lower opposite end of the actuating shaft or rod 98. A resilient member such as a coil spring 112 is interposed between the end of workholder drive shaft 78 and a dust seal washer or cap 114 seated against the inner hub or race of bearing 110. The spring 112 tends to bias the piston axially away from the housing 22 and shifts the actuating rod 98 downwardly causing the work clamps 96 to engage the cam surfaces 92d and thereby retracted within the slot 92c and periphery of the work locating shaft portion 92b. After which, a casting C can either be removed or placed thereon.

When a two way directional fluid control valve VC is actuated, fluid under pressure passes into the cylinder 104 and shifts the piston 108, the actuating rod 98, and the work clamps which are forced into clamping engagement with the casting C by the convex cam surfaces 102a. Thus the previously loaded casting C oriented by the pin 94 is forceably clamped against the work drive or support flange 92a. Upon deactuating the control valve VC the workpiece is released and the spring 112 returns the piston to its initial position while fluid exhausts from the cylinder 104 through the control valve VC.

A rotary fluid operated motor 120 is provided for rotating the clutch disc 62c, hub 62d shaft 66 bevel gears 72 and 74, shaft 78, and the workholddr 90 relative to the housing 22 about an axis normal to the substantially horizontal movable pivot axis of shaft 24, about which the work support head 20 pivots. On the rotary fluid operated motor 120 is a housing with a mounting flange 120a a one end thereof bolted to an end surface of a cylindrical motor support sleeve 122. The motor support sleeve extends axially and is fixed at its oppostie end to the flange 60a of the hollow shaft 60 and the driven cylinder 62a of the clutch 62. A pair of axially aligned rotatable output shafts or drive shafts 120b and 120c extend outwardly from opposite ends of the motor 120. The rotary motor 120 may be any suitable commercially available conventional double shafted reversible fluid operated motor, such as Model PRV-22 commercially available from Hartman Hydraulics Division of Koehring Company, Racine, Wis.

To the drive shaft 120b is fixed and keyed one flange or member of a drive coupling 124 having a second member or flange fixed and keyed to a shaft 62g fixed to the hub 62d of the clutch 62.

On the opposite end wall or surface of the housing of motor 120 is fixed another enclosure or cabinet 126, with an access door, similar to the cabinet 56. The shaft 120C of the rotary fluid motor 120 extends through the wall of the cabinet 126 and into a chamber therein.

Adjustable control means are provided for controlling the extent of the angular rotary movements of the workholder and the casting or workpiece C about the axis of the shaft 78 and to initiate further work feeding and/or work positioning movements of the mechanism 10. It comprises a cam support disc 128 fixed to and rotatable with the shaft 120c and has a plurality of adjustable cams 130 and 130a fixed at predetermined angular positions about its periphery and the axis of the shafts 120c and 66. Fixed to the wall of the cabinet 126 are a plurality of conventional limit switches LS3, LS4 and LS11. Each limit switch is actuated by at least one or more of the cams 130 to sequentially stop a previous work feeding or work positioning movement and/or initiate another work feeding or positioning movement.

It can be seen that when the clutch 62 is actuated the clutch disc 62c is coupled and locked to the clutch cylinder 62a and against relative movement by the clutch drive piston 62b. Upon withdrawing the tapered lock pin 46 and actuating the rotary actuator 30 shaft 24, lock pin lever arm 26, work support head 20, workholder 90, hollow shafts 60, shaft 66, clutch 62, support sleeve 122, coupling 124, fluid motor 120, cam support disc 128, and the cabiet 126 all rotate together. When the tapered lock pin 46 is inserted into the locating hole 26a of the lever arm 26, the work support head 20 cannot be pivoted. However, when the clutch 62 is deactuated with clutch disc 62c is now disengaged from and free to be moved by the rotary fluid motor 120 relative to the clutch drive piston 62b, the clutch cylinder 62a and the hollow shaft 60. Actuating and shifting a four way control valve VA in one direction will direct fluid under pressure to rotate the shafts 120b and 120c of the motor 120 in one direction. Actuating and shifting the control valve VA in the opposite direction will rotate the drive shafts 120b and 120c in the opposite or reverse direction. Hence, rotation of the drive shafts 120b and 120c in either direction causes a corresponding rotational movement of the cam support disc 128, coupling 124, shaft 62g disc 62c, shaft 66 the bevel gears 72 and 74, shaft 78, and the workholder 90 in the drive train coupled thereto. That is, when the shafts, 120b and 120c, cam support disc 128, and the bevel gear 72 rotate clockwise, as viewed from the right-hand end of the drive shaft 120c in FIGS. 3, 4, and 8; the bevel gear 74, shaft 74, and the workholder 90 are likewise rotated clockwise as viewed from the upper pointed end of the work locating shaft 92b of the work support arbor 92 in FIGS. 3, 4 and 8.

Cross feed means 140 are provided for simultaneously moving the carriage 16, work support head 20, and the workholder 90 about the longitudinal axis of the support shaft 14 towards and away from the cutting tool T for either positioning, feeding and/or retracting the casting C relative to the cutting tool T. The cross feed means or the carriage may comprise a pair of spaced link bars 142 each of which is pivotally connected at one of its rear end portions to a pivot pin or screw 144 fixed to the lower portion of the lever arms 16a and 16b between the axes of the shafts 14 and 24. From the lever arms 16a and 16b the link bars 142 extend outwardly away from the cutting tool substantially parallel to each other and each is fixedly connected at its forward end portion to a cross member or bar 142a. A bracket 142b is fixed to the cross tie bar 142a substantially midway between the link bars 142 and to which is connected an upper ball joint of another tie rod or bar 148 similar to but of shorter length than the tie rod 38. The second tie rod 148 extends downwardly and has a lower ball joint connected to the forward end of a channel iron or bracket 150 fixed at its opposite rear end to the I beam 12c and from which it extends outwardly and downwardly at a slight angle therefrom.

It can be seen that another four pivot or four bar linkage system is provided comprising the relatively fixed pivot axis of the shaft 14 and the lower ball joint stud of the shorter tie rod 148 and the relatively movable pivot axes of the pivot pins 144 and the upper ball joint stud of the tie rod 148. Thus the force applied by the cross feed cylinder 160 through link bars 142 to the carriage 16, work support head 20, workholder 90, and support shaft 14 to the casting C for the purpose of machining can be held relatively constant for various positions of cross feed toward and away from the cutting tool. Yet, the ball joints at opposite ends of the tie rod 148 allows the link bars 142 to move together with carriage 16 along the axis of shaft 14 parallel to the axis of rotation of the cutting tool T.

Above the cross member 142a is a cross feed bar 152 which extends between and is pivotally connected at its opposite ends to the forward end portions of the link bars 142 by axially aligned pivot studs or screws 154. The cross feed bar 152 has an elongated bearing slot 152a in which is rotatably mounted a handwheel 156 having a reduced cylindrical bearing engaging portion 156a extending from a shoulder through the elongated slot 152a and a threaded central hole 156b. A retaining collar or snap ring 156c in a groove around the cylindrical portion 156a engages the opposite side of the cross feed bar 152 and prevents the handwheel from moving axially relative thereto. However, the elongated slot 152a allows the cross feed bar 152 together with the link bars 142 and the carriage to move relative to and in a direction normal to the axis of the threaded hole 156b in the handwheel. Therefore, the link bars 142, the cross feed bar 152, and the tie rod 148 can also be considered as parts of the carriage as well as the cross feed means. Means for cross feeding the carriage together with the link bars 142, the cross feed bar and the tie rod 148 comprises an adjustable feed screw 158 extending through the threaded central hole 156b. The screw 158 is coupled at its opposite end to the end of a piston rod of a fluid actuated cross feed cylinder 160 pivotally attached to a forwardly projecting base portion, or support frame bracket B' fixed relative to the base B and/or the support frame 12. The base portion or bracket B' extends outwardly opposite the peripheral cutting face of the cutting tool T and to which is fixed a pivot support or pivot bracket 162. A cylinder pivot pin 164 pivotally connects the end of cylinder 160 to the pivot bracket 162, in the well known manner, to pivot about a fixed horizontal axis substantially parallel to the fixed longitudinal axis of the support shaft 14.

The fluid actuated cylinder 160 has an elongated cylinder bore in which is slidably mounted a piston 160b attached to the opposite end of the piston rod 160c therein. The cylinder 160 has a central axis aligned with the axis of the feed screw 158 and a plane situated substantially midway between the opposite axially spaced side faces of the cutting tool T and extending substantially perpendicular to the fixed horizontal axis of the pivot support 162.

Means are provided for controlling the extent of the cross feeding or positioning movements of the carriage 16 comprising an elongated limit switch support plate 166 fixed to the underside of the cylinder 160. A plurality of limit switches LS2, LS9, LS13, and LS1 are fixed to the support plate 166 at predetermined intervals along the axis of the cylinder 160.

A cam support plate 168 is fixed in any suitable conventional manner to the feed screw 158 and is movable axially with the piston rod relative to the cylinder 160 fixed against axial movement. On the cam support plate 168 are a plurality of spaced adjustable cams 170, and 170b each of which actuates one or more of the limit switches shown.

Upon actuating and shifting a conventional four way directional control valve VZ in either one of two opposite directions, fluid under pressure is admitted to one end of the cylinder 160 to shift the piston 160b toward the opposite end of the cylinder 160. Hence, the piston rod 160c, feed screw 158, cam support plate 168, cams 170 and 170b, cross feed bar 152, link bars 142, carriage 16, and the work support head 20 move relative to the cross feed cylinder 160 and the limit switches about the longitudinal axis of support shaft 14.

As shown in phantom lines (in FIG.2) the shorter center distance between the ball joints of the shorter tie rod 148 allows the angular relationship between the carriage 16 and the link bars 142 to change and provide the relatively constant cutting force as previously described above. The angular position of the axis of the cylinder 160 and the feed screw 158 changes very little relative to the link bars 142 since the cylinder 160 pivots about a fixed axis causing only a small amount of pivotal movement of the cross feed bar 152 about the pivot screws 154 connected to the link bars 142. By turning the handwheel 156 relative to the feed screw 158 the stroke of the piston and hence its position relative to opposite ends of the cylinder 160 can be varied and adjusted to provide the necessary amount of feed or positioning movement. When the piston 160b is held against axial movement by the fluid in the cylinder 160 rotating the handwheel 156 causes the carriage to move relative to the feed screw 158 to locate the initial starting or loading position of the work support head 20 and to compensate for wear and reduction in the size of the cutting tool.

Longitudinal traversing means 170 are provided for simultaneously traversing the support shaft 14, carriage 16, link bars 142, cross feed bar 152, the work support head 20 and the workholder 90 together along the longitudinal axis of the shaft 14 substantially parallel to the axis of rotation of the cutting tool T and relative to the base frame 14, cylinder 160, feed screw 158, handwheel 156 base B and the cutting tool T. The longitudinal traversing means 170 comprises a fluid actuated cylinder 172 fixed, as by bolting, to the cylinder support member 12 of the base frame 12. A piston 172a is slidably mounted within a bore in the cylinder and to which is fixed a piston rod 172b coupled to the end portion of the support shaft 14 extending through and beyond the bearing 16c in the lever arm 16b. Upon actuating and shifting a four way directional fluid control valve VX in either one of two directions, fluid under pressure is directed to one end of the cylinder 172 to shift the piston 172a, a piston rod 172b and the support shaft 14 and attached members together in an opposite direction relative to the cylinder 172 and the base frame 12.

Means to control the extent of the longitudinal traversing and/or positioning movements comprises a longitudinal traverse limit switch support plate 174 fixed to a side of the cylinder 172 and to which is fixed a plurality of limit switches such as LS7 and LS8. Fixed to and movable with the support shaft 14 and/or the lever arm 16b is a cam support bracket 176 extending outwardly therefrom and above the cylinder 172. A cam support bar or plate 178 is fixed to the bracket 176 and has a plurality of adjustable cams 180 and 180a thereon which actuate the limit switches to sequentially stop a previously initiated movement and/or initiate a work feeding or work positioning movement.

Fluid supply means are provided for supplying fluid under predetermined pressures to the various fluid actuated components of the mechanism 10 comprising a reservoir or source of fluid 190, a conventional and suitable fluid pump P driven by a motor FM and a conventional adjustable pressure relief valve 192 connected between the main supply lines s and the main return lines R, for maintaining the fluid in the supply lines or conduits S at the desired pressure. Other pressure relief valves and pressure reducing valves are provided for operating certain of the components at pressures different than the pressure of the fluid in the main lines S.

The fluid operated system for actuating the various components of the mechanism 10 can be either totally hydraulic or pneumatic or a mixture of conventional hydraulic and pneumatically operated components. Preferably a hydraulic system is more desirable where precise control is necessary. However, where precise control is not essential and quick action is desired a separate line of compressed air under controlled pressure which is available in most foundries and manufacturing plants, can be connected separately to those particular components of the system. For example, the supply lines S to and the directional control valves VC, VE and VD could be disconnected from the hydraulic system and connected to a separate conventional source of air under regulated pressure. Thus the work clamp cylinder 104, the lock pin cylinder 40 and the fluid clutch 62 are quickly operated pneumatically while the rest of the system is operated hydraulically.

To simplify the description only one of each different type of the directional control valves has been shown in detail. All of the conventional four way directional control valves VX, VZ, VB are of the same general construction as valve VA shown in more detail and are commercially available from a number of sources for use in hydraulic and pneumatic fluid pressure systems. Specifically the control valves VX, VZ, VB and VA shown have push type solenoids at opposite ends of a spring centered fluid directing spool with three chambers and a central exhaust passage extending between the end chamber. Energizing the solenoid shifts the spool away from that particular solenoid and de-energizing the solenoid allows the balanced springs between the solenoids and the spool to return and center the spool as shown.

Likewise the two way directional control valve VE is of the same general and conventional construction as the valve VC shown in detail. They have a single push type solenoid at one end of a fluid directing spool with two chambers and a return spring biasing the spool towards the solenoid. Energizing the solenoid shifts the spool towards and compresses the spring which returns the spool when the solenoid is de-energized.

The four way directional control valve VD is similar to and operates in the same manner as does the two way control valves VE and VC, except that it has an additional chamber, land, and passage to make it a four way valve instead of a two way.

Most of the fluid actuated component and controls shown in the drawings are conventional and commercially available from many different manufacturers therefore it is deemed unnecessary to describe the specific construction of each individual conventional component as they are well known in the art.

Programmed control means are provided within a cabinet CM for actuating and deactuating the various components of the mechanism 10 described above so as to position and feed various portions of the workpiece or casting C into the cutting tool T in a predetermined sequence of operations. The programmed means comprises a plurality of conventional stepping switches ST1, ST2, ST 3 and ST 4 which may be of any suitable commercially available type such as, a linear or rotary stepping switch mechanism with either cam programmable contacts, or an equivalent electrically programmable solid state stepping switch such as Model MT-50 commercially available from Eagle Signal Corporation, Davenport, Iowa.

The operation of the stepping switches are well known in the art and therefore only a brief description of their operation is deemed necessary. A stepping switch mechanism comprises basically a predetermined number of contacts, programmed means shifted simultaneously and incrementally one step at a time by either a stepping motor, a step coil or an electromagnet operated ratch system which closes one or more of the contacts at the proper time and increent the step switch is advanced during a complete cycle thereof.

Figure 9:
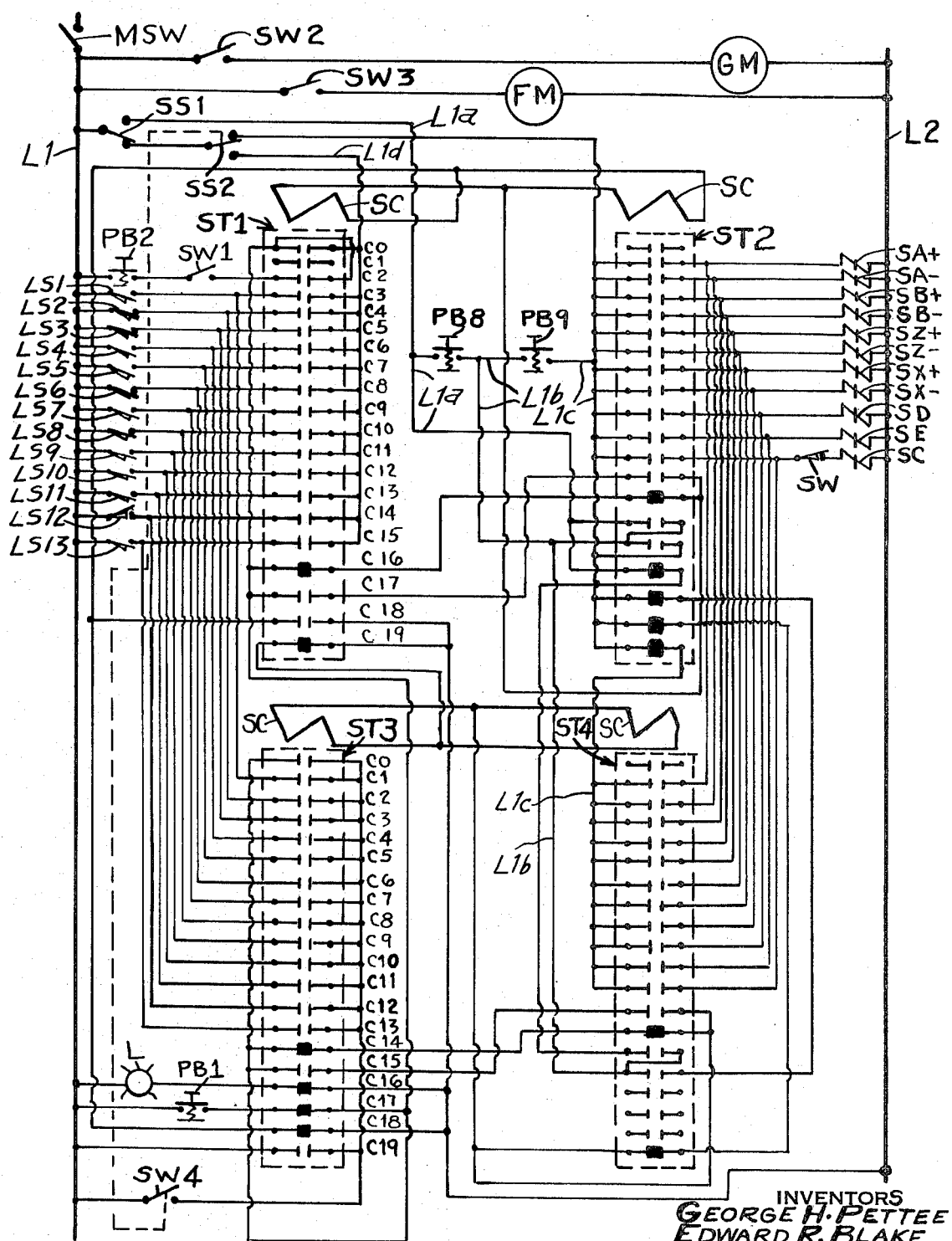
FIG. 9, is an electrical diagdam of the electrical control means of the invention including a plurality of conventional programmable stapping switches.

As shown in FIG. 9, a plurality of contacts of both of the stepping switches ST1 and ST3 are connected in parallel with each other and connected in series with the contacts of the limit switches LS1 and LS13, a start push button PB2, and a start switch SW1 all connected to the electrical lines L1 and L2.

In a similar fashion a plurality of contacts of the stepping switches ST2 and ST4 are shown connected in parallel with each other and connected to electrical lines L1 and L2 in series with the solenoids SA+, SA—, SB+, SB—, SZ+, SZ—, SX+, SX—, SD, SE, and SC of the respective fluid pressure directional control valves associated therewith.

As shown, the conventional electromagnetic step coil and step mechanism SC of the stepping switches ST1 and ST2 are connected in parallel and step together. Likewise the conventional electromagnetic step coil and step mechanism SC of the stepping switches ST3 and ST4 are connected in parallel and step together. However, the stepping switches ST3 and ST4 do not begin to operate until the stepping switches ST1 and ST2 have completed one cycle of a predetermined number of increments. By this time only a predetermined number of the total number of the programmed work positioning and feed movements necessary to finish the casting C have been performed. All of the programmed contacts of stepping switches ST1 and ST2 have been utilized. Therefore, a set of contacts of each of the stepping switches ST1 and ST2 are closed on the last step to direct all future electrical energy from the limit switches and from L1 through the programmed contacts of the stepping switches ST3 and ST4.

The remaining sequence of the work positioning and feed movements are now under the control of the programmed stepping switches ST3 and ST4 which operate simultaneously in same manner as the switches ST1 and ST2. Only when a limit switch contact and the contact of the stepping switch in series therewith is programmed to be closed, can electrical energy from line L1 simultaneously energize the electromagnetic coils of either the stepping switches ST1 and ST2 or ST3 and ST4. Hence, the cams can move back and forth over and actuate any of the limit switches connected in series with the programmed open contacts of the stepping switches without affecting the stepping switches.

Each of the stepping switches has its own individual predetermined program which is synchronized with one another to either open, hold open, close or hold closed each individual set of contacts of the stepping switches at the proper time or step in the stepping cycle.

One type of commercially available stepping switch which may be utilized in the mechanism 10 is of the rotary type, Model MT-19 commercially available from Eagle Signal Corporation of Davenport, Iowa. A solid state equivalent being Model MT-50 available from the same source. The rotary type of stepping switches utilize a rotary programmable cam for actuating each set of contacts and which can be readily fixedly attached and detached from a rotatable camshaft to change the program and sequence of operations. The cycle of each stepping-switch comprises one complete 360° revolution of the camshaft. The particular stepping switches shown have twenty contacts C0–C19 and require sixteen steps to complete one revolution before the cycle is repeated. Each step rotates the camshaft and all the programmed cams fixed thereto one-sixteenth of 360° or an increment of 22½°. The circumferential portion of the conventional interchangeable program cams are likewise divided into the same number of equal circular segments any one of which can be broken away from or left on the cam to engage and close the contacts at the desired time or step in the cycle.

It can be seen that by providing a sufficient number of limit switches, limit switch actuating cams and the proper contact program such as, a set of programmed cams, in the stepping switches the mechanism 10 can be sequenced to position and/or feed most any portion of a casting or workpiece into engagement with the multi-point cutting tool T. Also, the mechanism 10 can be reprogrammed to produce a different number and variety of movements in most any sequence desired.

OPERATION

By way of example, only the programmed sequence of operation of the mechanism 10 for holding, positioning, and feeding various portions of the particular differential casting C shown into the cutting tool T will be described.

A source of electrical power is supplied to the various limit switches LS1-LS13 and other electrical components by closing a main line switch MSW. Selector switches SS1 and SS2 are positioned to supply power from L1 to the contacts of steeping switches ST2 and ST4. Switch SW1 is closed to ready cycle. Closing switch SW2 starts the cutting tool drive motor GM. Closing SW3 starts the fluid pump drive motor FM to supply fluid under pressure through the supply lines S. Fluid under pressure passes through conventional adjustable pressure reducing valves 196, 198 and a conventional adjustable throttle valve 200 to the pressure ports of the respective directional control valves VX, VZ, and VA. Similarly, fluid under pressure is supplied directly from the lines S to the pressure ports of the directional control valves VE, VC, VB and VD through which it passes to the right side of the lock pin clamping cylinder 40 to withdraw the tapered lock pin 46 from engagement with the lever arm 26.

Figure 8:
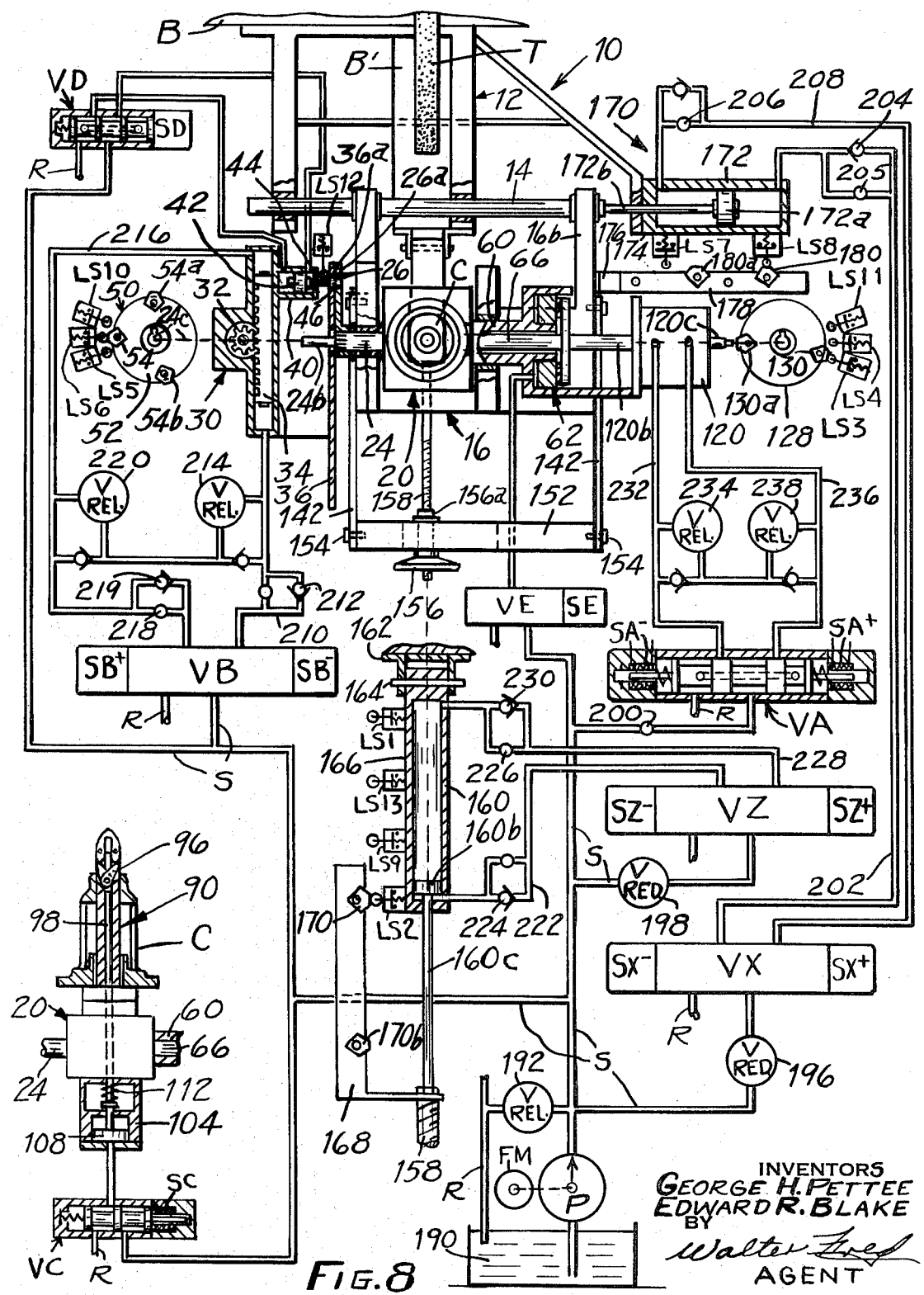
FIG. 8, is a diagrammatic view showing the various movable components of the invention, the fluid pressure operated means for moving the various movable components, and the directional control means therefor.

The work clamping cylinder 104, the work clamps 96, the cross feed piston 160b, and the carriage 16 are retracted to the work loading, or stop and starting position shown in FIGS. 7, 5, 8 and by phantom lines in FIG. 2. Clutch means 62, rotary actuator 30, and rotary fluid motor 120 are deactuated maintaining the workholder 90 and the work support head generally in the starting positions shown. The normally open contacts of the limit switches LS2, LS3, LS6 and LS8 are held closed by the adjustable cams, the normally open contacts of limit switches LS1, LS4, LS5, LS7, LS9, LS10, LS11, and LS13 are open and the normally closed contacts of LS12 are held open by the withdrawn tapered lock pin 46.

There are four identical stepping switch mechanisms ST1, ST2, ST3 and ST4 each of which has 20 contacts indicated by characters C0 and C19 placed adjacent one only of each pair of the simultaneously actuated stepping switches ST1, ST2, ST3 and ST4. Each stepping switch has completed 16 steps or one revolution for a total of 32 steps and are now in the loading or stop and start position. Contacts C16 and C19 of stepping switch ST1 and contacts C14, C16, C17 and C18 of stepping switch ST3 are closed. Contacts C13, C16, C17, C18 and C19 of ST2 and contacts C13 and C19 of ST4 are closed.

The finished casting C is removed and/or another unfinished casting C is placed onto the workholder 90 with the locating pin 94 in the locating hole of the casting C. Push button PB1 is momentarily closed causing the stepping switches ST1 and ST2 to advance to the first position or cycle start position of the mechanism 10.

Contacts C16 and C19 of ST1 and contacts C13, C16, C17, C18 and C19 of ST2 open.

Contacts C2, C17, C18 of ST1 and contacts C9, C10, C11, C12 and C14 of ST2 close, energizing solenoids SD, SE, and SC which actuate the control valves VD, VE and VC. The tapered lock pin 46 is shifted to the right into locking engagement with the lever arm 26 allowing normally closed contacts of LS12 to close. Clutch 62 is actuated to prevent relative motion between the workholder 90 and the work support head housing 22 and the casting C is clamped to the workholder by the clamping cylinder 104.

Closing push button PB2 completes a circuit through now closed SW1 to advance stepping switches ST1 and ST2 to the second position. Contacts C9, C16, C18 and CO of ST1 and contact C7 of ST2 close energizing solenoid SX+ shifting spool in valve VX to the left. Fluid under pressure passes through a pipe 202 a check valve 204 into the right end of traversing cylinder 172 and traverses the carriage 16 toward the left at a rate controlled by a throttle valve 206 in the pipe 208 through which the fluid exhausts from the opposite end of the cylinder through valve VX and return line R to the reservoir 190. Closed limit switch LS8 opens and cam 180a actuates LS7 when the right-hand flat window wall of casting C is properly aligned with the left corner and side face of grinding wheel shown by example only as the multi-pointed cutting tool T. Closing contacts of LS7 advances the stepping switches ST1 and ST2 one more increment to a third position through the now closed contacts C9 of ST1.

Contacts C9 of ST1 and C7 and C9 of ST2 open de-energizing solenoids SD and SX+. Contacts C12, of ST1 and contacts C3, of ST2 close energizing solenoid SB+. Spool in control valve VD is shifted, by spring, to the right directing fluid under pressure to right side of cylinder 40. Tapered lock pin 46 is withdrawn, opening contacts of limit switch LS12. Fluid exhaust from left side of cylinder 40 through valve VD to return line R to reservoir 190.

Solenoid SB+ shifts spool of valve VB to the right allowing fluid under pressure through a pipe 210 and check valve 212 into the bottom end of rotary actuator 30 at a pressure controlled by an adjustable relief valve 214. Rack piston 34 is moved upwardly which rotates the gear 32, shaft 24, cam support disc 50, lever arm 26, the work support head 20, the workholder 90 and the casting C toward the cutting tool T. The casting C is pivoted about the axis of the shaft 24 until the longitudinal axis of the workholder 90 and casting C is aligned with and lies substantially in a plane passing through the axis of rotation of the cutting tool T and the axis of the pivot drive shaft 24. Fluid exhaust from the opposite top end of the rotary actuator 30 through a pipe 216, at a rate controlled by a throttle valve 218, and the valve VB to a return line R and reservoir 190. An adjustable relief valve 220 also controls the pressure of the fluid in pipe 216. When the predetermined angular position of the casting C is reached the adjustable cam 54a actuates and closes contacts of limit switch LS10 which through previously closed contacts C12 of ST1 advances the stepping switches ST1 and ST2 to the next or fourth position. Contacts C15 of ST1 and contacts C5 of ST2 are closed. Contacts C3 of ST2 open de-energizing solenoid SB+ allowing spool of valve VB to center and stopping movement of rotary actuator 30 which holds casting C in position. The previously held closed contacts of LS6 open. Closing contacts C5 of ST2 energizes solenoid SZ+ shifting spool in valve VZ to left and allowing fluid under pressure, controlled by the pressure reducing valve 198, to pass through pipe 222 and check valve 224 into the forward end of the cross feed cylinder 160. Piston 160b, piston rod 160c, the feed screw 158, cross feed bar 152, link bars 142, the carriage 16, work support head 20, and the workholder are pivoted about the longitudinal axis of shaft 14 towards the cutting tool T. As the carriage 16 pivots about axis of the support shaft 14, the initial angular position of the longitudinal axis of both the casting C and workholder 90 is maintained by the four bar linkage system including the tie rod 38. The right-hand flat side of the casting C is fed into the left corner of the cutting tool T, and with its longitudinal axis substantially normal to the axis of rotation of the cutting tool T. Cross feed rate is controlled by a throttle valve 226 in pipe 228 through which fluid exhausts from the cylinder 160. Excess cast material is removed from the right-hand flat side of the housing to the flange of casting C and to a predetermined dimension from its central longitudinal axis. Contacts of LS2 open and the limit switch LS13 is actuated at the end of the cross feed stroke of piston 160b by the adjustable cam 170 on cam support bar 168.

Contacts of LS13 close and through previously closed contacts of C15 of ST1 advances the stepping switches ST1 and ST2 to the fifth position. Contacts C5 of ST2 open de-energizing SZ+ and contacts C4 of ST1 and contacts C6 of ST2 close energizing solenoid SZ−, shifting valve VZ to the right and passing fluid under pressure through pipe 228 and a check valve 230 into the rear side of cylinder 160. Piston 160b retracts carriage 16 and hence casting C, cam support bar 168 away from cutting tool where upon limit switch LS2 is closed by cam 170. Stepping switches ST1 and ST2 advance to the sixth position opening contacts C4 of ST1, C6 and C10 of ST2 open. Contacts C6 of ST1 and contacts C1 of ST2, close. Opening contacts C10 of ST2 de-energizes solenoid SE shifting valve VE to the right allowing fluid to exhaust from and deactuate fluid brake or clutch 62. Opening contacts C6 of ST2 de-energizes solenoid SZ−, spool of valve VZ centers stepping movement of carriage 16. Closing contacts C1 of ST2 energizes solenoid SA+ shifting control valve VA to the left, passing fluid through a pipe 232, under a pressure controlled by a relief valve 234 to actuate the rotary fluid motor 120. Fluid exhausts from motor 120 through pipe 236, under a pressure controlled by relief valve 238, and valve VA to return line R at a rate controlled by throttle valve 200. Motor shafts 120b and 120c, cam support disc 128, shaft 66, and hence the casting C is turned clockwise 180° through the bevel gears 72 and 74. The opposite left-hand flat side of the casting C is now positioned opposite the left side face of the cutting tool T. In this position limit switch LS4 is actuated by cam 130a and ST1 and ST2 advance to the seventh step position closing contacts C15 of ST1, C5 and C10 of ST2 and opening contacts C1 of ST2 which de-energizes solenoid SA+ allowing spool of valve VA to center and stop rotary motor 120. Solenoid SE is energized shifting valve VE passing fluid under pressure to actuate fluid brake or clutch 62. Solenoid SZ+ is energized shifting valve VZ to the left passing fluid under pressure through pipe 222 to forward end of cylinder 160. Carriage 16, cam support bar 168, and hence the casting C is again cross fed into the left-hand corner of the cutting tool T which removes excess cast material from the side around the initial left-hand window of differential housing of casting C.

Instead of rotating the casting 180° as described above the cycle could have been programmed to traverse the casting to the right and feed the left-hand flat side of the casting into the right-hand corner of the cutting tool T.

Limit switch LS13 is again actuated and through closed contacts C15 of ST1 advances the stepping switches ST1 and ST2 to the eighth position. In this step position contacts C15 of ST1 and C5 of ST2 open de-energizing solenoid SZ+ and contacts C4 of ST1 and contacts C6 of ST2 close energizing solenoid SZ− shifting valve VZ to the right. Fluid under pressure passes to rear of cylinder 160 to retract carriage 16 and hence the workpiece away from the cutting tool T, whereupon limit switch LS2 is again actuated to advance ST1 and ST2 to the ninth position. Contacts C4 of ST1 and C6 of ST2 open de-energizing SZ− and spool in valve VZ center. Contacts C8 of ST1 and C4 of ST2 close energizing SB− and shifting spool in valve VB to the left, passing fluid under pressure through a pipe 216 and check valve 219 to the top end of the rotary actuator 30. Rack piston 34 rotates gear 32, shaft 24, cam support disc 50, lever arm 26, the work support head 20, the workholder 90, and the casting C away from the cutting tool T. Cam 54 actuates limit switch LS6 and through close contacts C8 of ST1 advances ST1 and ST2 to the tenth step or position Contacts C8 of ST1 and C4 of ST2 open de-energizing SB−, and spool of valve VB centers. Contacts C14 of ST1 and C9 of ST2 close energizing solenoid SD shifting valve VD to the left passing fluid under pressure to cylinder 40 to insert tapered lock pin 46 into aligning hole of lever arm 26. Normally closed limit L12 is actuated by movement of tapered lock pin 46 closing its contacts which through closed contacts C14 of ST1 advance ST1 and ST2 to the eleventh position. Contacts C14 of ST1 open and contacts C10 of ST1 and C8 of ST2 close energizing solenoid SX− shifting spool of valve VX to the right. Fluid under pressure passes through pipe 208, and check valve 209 into left end of traverse cylinder 172. Piston 172a, cam support bar 178, support shaft 14, carriage 16, work support head 20, workholder 90, and hence the casting C are traversed to the right and returned to the position shown in FIG. 8 at a rate controlled by a throttle valve 205 in pipe 202. Limit switch LS8 is actuated by cam 180 closing its contacts to advance ST1 and ST2 the twelfth position. Contacts C10 of ST1, C8 and C10 of ST2 open de-energizing solenoids SX− and SE. Spools of valve VX centers and spool of valve VE shifts to the right allowing fluid to exhaust from and deactuate fluid clutch 62. Contacts C13 of ST1 and C1 of ST2 close energizing solenoid SA+ shifting the spool of valve VA to the left. Fluid passes through pipe 232 rotating rotary motor 120, and hence the casting C clockwise 180° about its logitudinal axis and the normal axis of the workholder situated almost in a vertical plane and in the retracted phantom line position shown in FIG. 2.

Cam 130 moved 180° by a previous clockwise movement is again moved clockwise actuating limit switch LS11. Stopping switches ST1 and ST2 advance to the thirteenth stop opening contacts C13 of ST1 and C1 of ST2 de-energizing solenoid SA+, deactuating valve VA, and rotary motor 120. Contacts C3 of ST1, C5, and C10 of ST2 close energizing solenoids SE and SZ+. Valve VE shifts to actuate clutch 62 and valve VZ shifts to the left causing a cross feed movement of the carriage 16 to remove a segment of a gate on the periphery of the ring gear mounting flange of casting C by the circular cutting face portions of the cutting tool T. At the end of the cross feed, cam 170 actuates limit switch LS1 closing contacts thereof to advance ST1 and ST2 to the next or fourteenth position. Contacts C3 of ST1 and C5 of ST2 open de-energizing SZ+ and spool in valve VZ centers. Contacts C4, ST1 and C6, ST2 close energizing solenoid SZ− shifting valve VZ to the right and retracting carriage and flange of casting C away from cutting tool T. Cam 170b actuates limit switch LS2 and stops ST1 and ST2 to the next fifteenth position. Contacts C4 of ST1 and C6 and C10 of ST2 open de-energizing solenoids SZ− and SE. Spool of valve VE returns, fluid exhausts deactivating clutch 62, and spool of valve VZ centers. Contacts C6, ST1, C1 of ST2 close energizing solenoid SA+ shifting control valves VA to left, passing fluid to rotate rotary motor 120 and hence the casting C a short distance clockwise about its longitudinal axis unitl cam 130 actuates LS4 advancing stopping switch ST1 and ST2 to their sixteenth and original starting position. Contacts CO, C6 and C18 of ST1, and C14, C15 of ST2 open breaking circuit to stop coils SC of ST1 and ST2.

Contacts C16, C19 of ST1 and C13, C16, C17, C18, C19 of ST2 close to ready circuits for transferring further sequence of cycle operations under the control of the programmed stopping switches ST3 and ST4. Closing contacts C18 of ST2 through now closed contacts C19 of ST4 and ST1 energize the stop coils SC of both ST3 and ST4 to advance them to their first stop and the seventeenth stop in the cycle. Contacts C14 and C16 of ST3, C13 and C19 of ST4 open.

Contacts C15, C19 and CO of ST3; and C12 and C14 of ST4 close energizing stop coils to advance ST3 and ST4 into their second step but the eighteenth of the cycle. Contacts C15 and C19 of ST3, contacts C12 and C14 of ST4 open. Limit switch and ST3 circuits are now ready to initiate further programmed operations. Contacts C12, C14, of ST3, and C9, C10, C11, C13 and C15 of ST4 are closed. Solenoid SE is energized shifting valve VE and actuating or engaging clutch 62. ST3 and ST4 are advanced to their third and nineteenth position by a circuit through now closed contacts of LS12 and C12 of ST3.

In the nineteenth cycle position contacts C12 and C14 of ST3 and contacts C13 and C15 of ST4 open. Contacts C1 and C15 of ST3, and C5, C12 and C14 of ST4 close. Solenoid SZ+ is energized, shifting control valve VZ and cross feeding the flange of casting C into the cutting face of the cutting tool T. Another segment of the gate on the flange is removed whereupon cam 170 actuates limit switch LS1. Contacts LS1 close to advance the stepping switches ST3 and ST4 to their fourth but the twentieth cycle position. Contacts C1 of ST3 and C5 of ST4 open de-energizing SZ+ and spool in valve VZ centers. Contacts C2 of ST3 and C6 of ST4 close energizing solenoid SZ− shifting valve VZ to retract casting C away from cutting tool until cam 170b actuates LS2. Contacts LS2 close energizing step coils SC of ST3 and ST4 to advance them to their fifth and twenty-first position of the cycle.

Contacts C2 of ST3, C6 and C10 of ST4 open de-energizing solenoid SE shifting valve VE and deactuating or disengaging the clutch 62. Contacts C3 of ST3 and C1 of ST4 close energizing solenoid SA+ shifting valve VA to the left to actuate rotary motor 120. Motor 120 rotates casting C clockwise until cam 130 actuates limit switch LS3 which advances stopping switches ST3 and ST4 to their sixth but the twenty-second cycle position. Contacts C3 of ST3 and C1 of ST4 open de-energizing solenoid SA+ and spool in valve VA centers to stop rotary motor 120. Contacts C1 of ST3 and C5 and C10 of ST4 close energizing solenoids SE and SZ+ shifting valves VE to actuate clutch 62 and valve VZ to feed the last segment of the gate on the flange of casting C into the cutting tool T. Cam 170 actuates LS1 which advances ST3 and ST4 to their seventh and twenty-third cycle positions. Contacts C1 of ST3, C5, and C10 of ST4 open de-energizing solenoid SZ+ and SE. Spool in valve VZ centers stopping cross feed and valve VE return to allow exhaust from and to deactuate clutch 62. Contacts C4 of ST3 and C2 of ST4 close energizing solenoid SA— shifting spool of valve VA to the right. Fluid under pressure passes into pipe 236 and rotates rotary motor 120 and hence the casting C counter clockwise. The casting C is rotated against the wheel to smooth over that portion of the flange from which the large gate was previously removed during the three previous feed strokes of the casting, into the cutting tool T. Casting C and cam support disc 128 rotate counter clockwise during which time cam 130 actuates limit switch LS4 advancing ST3 and ST4 to their eighth and twenty-fourth step of the cycle. Contacts C4 of ST3 open, contacts C11 of ST3 and C2 of ST4 close holding solenoid SA— energized and valve VA shifted to continue counterclockwise rotation of motor 120 and casting C. Cam 130 actuates limit switch LS11. The entire gate portion of the circumferential surface of flange on casting C has been engaged and smoothed by the cutting tool T.

Closing contacts LS11 stops ST3 and ST4 to their ninth and twenty-fifth cycle position. Contacts C11 of ST3 and C2 of ST4 open de-energizing solenoid SA—, spool in valve VA centers stopping rotary motor 120. Contacts C9 of ST3, C6, and C10 of ST4 close energizing solenoids SZ— and SE shifting valve VZ to the right and valve VE to the left. Fluid under pressure passes through pipe 228 into rear end of cylinder 160 retracting carriage 16, casting C and cam support bar 168 away from cutting tool T and through valve VE to actuate clutch 62. Cam 170 actuates LS9 during retraction of carriage 16 to stop ST3 and ST4 to their tenth and the twenty-sixth cycle position. Contacts C9 of ST3 open and contacts C2 of ST3, C6, and C10 of ST4 close maintaining solenoid SZ— energized and valve VZ shifted to continue retracting carriage 16 and casting C away from cutting tool T and maintaining the clutch 62 actuated. Near the end of the rearward movement of carriage 16 and the cam support bar 168 cam 170 actuates LS2 advancing ST3 and ST4 to their eleventh and the twenty-seventh cycle position. Contacts C2 of ST3, C6, and C10 of ST4 open de-energizing solenoids SZ— and SE. Valve VE shifts to declutch clutch 62. Spool in valve VZ centers stopping retraction of carriage 16 and casting C in the back position shown. Contacts C4 of ST3, and C2 of ST4 close energizing solenoid SA— shifting the control valve VA to the right. Fluid under pressure passes to rotate rotary motor 120 counterclockwise. Cam 130a actuates LS4 advancing ST3 and ST4 to their twelfth and the twenty-eighth cycle position. Contacts C4 of ST3 open, contacts C3 of ST3 close and C2 of ST4 remain closed holding solenoid SA— energized and motor 120 rotating casting C counterclockwise back to the initial work loading and starting position whown whereupon cam 130 actuates LS3. Contacts of LS3 close stopping ST3 and ST4 to their thirteenth and the twenty-ninth cycle position. Contacts C3 of ST3, C2 and C11 of ST4 open de-energizing solenoids SA— and SC. Spool in valve VC shifts allowing fluid to exhaust to unclamp casting C, and spool in valve VA centers stopping rotary motor 120 and rotation of casting C. Contacts C19 of ST3 and C10 of ST4 close energizing the stop coils of ST3 and ST4 solenoid SE, shifting valve VE, and applying clutch 62.

Stopping switches ST3 and ST4 advance to their fourteenth and the thirtieth cycle position. Contacts C19 of ST3 remain closed and automatically advances ST3 and ST4 through their fifteenth and sixteenth stops and the thirty-first and thirty-second cycle positions. The stopping switches ST3 and ST4 are now in their sixteenth and original starting position and the thirty-second cycle starting position. In this position contacts C15, C19 and C0 of ST3, and contacts C9, C10, C12, C14 and C15 of ST4 open preventing further energization of step coils ST3 and ST4. Solenoid SD and SE are de-energized allowing VD and VE to shift to the right. Fluid exhausts from and declutches clutch 62. Fluid pressure passes to cylinder 40 withdrawing tapered lock pin 46 which actuates and opens normally closed contacts of LS12. Contacts C14, C16, C17, C18 of ST3 and contacts C13 and C19 of ST4 close to ready circuits and transfer further sequence of programmed operations to the control of stopping switches ST1 and ST2 to repeat the programmed snagging cycle described above. Closing contacts C16 of ST3 closes circuit to light a lamp L indicating the end of the snagging cycle whereby the finished casting is removed and replaced with an unfinished casting.

Semi-automatic means are provided whereby an operator can alternately press push buttons PB8 and PB9 causing the mechanism 10 to perform the programmed sequence of operation step by step. Shifting selector switch SS1 from the position shown into engagement with the opposite contact of SS1 in line L1a connects L1 to PB8 and to the contacts C14 and C17 of ST2 and to contacts C14 of ST4. Normally open push button PB8 is connected in a line L1b extending between line L1a and contacts C15 of both ST2 and ST4. Normally open push button PB9 is connected in a line L1c extending between line L1b and the contacts C0-C19 of ST2 and through now closed contacts C19 of ST4. Once the casting C is loaded, pressing PB1 advances ST1 and ST2 to the first stop whereupon contacts C16 and C19 of ST1; C13, C16, C17, C18, and C19 of ST2 open. Contacts C2, C17, and C18 of ST1; contacts C9, C10, C11, C12 and C14 of ST2 close. Tapered lock pin 46 is inserted, clutch 62 is actuated and the casting C is clamped as before described. Pressing PB2 advances ST1 and ST2 to the second step whereupon contacts C2 and C17 of ST1, and contacts C12 and C14 of ST2 open. Contacts C9, C16, C18, and C0 of ST1 and contacts C7, C9, C10, C11, C13, and C15 of ST2 close.

Contacts of both ST1 and ST3 are connected in parallel and in series with all of the limit switches LS1 through LS13 in the manner described above for automatic operation by the closing of contacts C0 of ST1. Limit switches can now advance the stopping switches as before to stop a previous movement. However, subsequent movements cannot occur until one of the push buttons PB8 or PB9 is closed since the shifting of the selector switch SS1 has opened the line between L1 and the contacts C0-C19 of ST2 and ST4. Now electrical current must pass through one of alternately closed contacts C14 and C15 of ST3 and ST4. For example contacts C14 of ST2 are open and contacts C15 of ST2 are closed at this time. Closing PB8 closes a circuit through now closed contacts C15 of either ST2 or ST4 and through may other closed contacts of either of ST2 or ST4 to the solenoid connected in series therewith. The push buttons PB8 and PB9 must be held closed to continue and complete that particular movement or operation whereupon the next limit switch in the sequence is operated to simultaneously advance the stopping switch mechanisms. In the following position contacts C15 of either ST2 or ST4 open and contacts C14 of either ST2 or ST4 close connecting L1 to line L1$b$. Thus, holding PB8 is closed any longer has no affect and movements stop until the operator closes PB9 closing a circuit through any set of closed contacts C0–C19 of either ST2 or ST4 to the solenoids. The same programmed sequence of operations is continued by alternately pressing and holding PB8 and PB9 closed.

Reset means are provided including a reset selector switch SS2 for simultaneously resetting the pair of stopping switches ST1 and ST2, and a switch SW4 interlocked to operate simultaneously with SS2 for simultaneously resetting the pair of stopping switches ST3 and ST4. Simultaneously closing SW4 and shifting SS2 from the position shown into engagement with contacts of line L1$d$ connects L1 through closed contacts C0, of either ST1 or ST3 which would be closed, to either the contacts C16 and C17 of ST1 or the contacts C14 and C15 of ST3. Since SS2 has been shifted the circuit between L1 and the contacts of both ST2 and ST4 is opened. No further movement can take place and the pair of stopping switches controlling the program at this time are returned to their sixteenth or zero starting position. This is done by the program which alternately opens and closes contacts C16 and C17 of ST4 and of contacts C12 and C13 of ST2 connected in series, therewith, as shown. Hence one or the other of the alternately opened and closed circuits will be closed to stop the coils continuously until the contacts C0 of ST1 and ST3 open. Likewise, a pair of alternately opened and closed contacts C14 and C15 of ST3 are connected in series with alternately opened and closed contacts C12 and C13 of ST4. Therefore shifting SS2 to connect line L1 to L1$d$ and closing SW4 will reset ST3 and ST4 to their sixteenth or zero starting position and the thirty-second snagging cycle position whereupon contacts C0 of ST3 open.

It is obvious that the casting C could have been worked upon in a different programmed sequence than described above. For example the gate on the flange could have been removed before removing the flash on the flat sides around the right and left-hand windows of the differential housing.

Also, the program could have been sequenced to unclamp and automatically unload the finished casting into a bin placed adjacent the mechanism 10. The work support head would be pivoted backwardly, upon retracting the carriage 16, sufficiently to allow the casting to drop off the workholder. The snagging cycle described above in actual practice takes approximately twenty-five seconds to complete and is done automatically once that particular casting C is loaded on the mechanism 10 and push buttons PB1 and PB2 are depressed by the operator. Thus operator fatigue is eliminated and all castings are ground alike, faster, and at a higher feed rate and pressure than possible by hand. Four basic motions, representing the hand movements required by an operator to grind about 75 percent of the high volume automotive castings can be duplicated by the programmed mechanism 10. A set of programmed cams for each of the stopping switch mechanisms, cam support discs, and cam support bars with the properly spaced predetermined number of cams thereon or equivalent electrical means, such as printed wiring boards for use with the equivalent solid state stopping switch mechanisms can be made up in advance for each casting to be worked. The set up or change over process between castings taking but a few minutes to accomplish.

The foregoing description of the mechanism shown in the drawings is considered as illustrative only of the principles of the invention. Many modifications and changes may be made of the invention by those skilled in the art without departing from the spirit of this invention. Therefore, it is to be understood that the invention is not limited to the construction and operation shown as described but includes all modifications and equivalents falling within the scope of the appended claims.

What is claimed is:

1. A mechanism for holding a workpiece, seequentially positioning, and feeding unwanted portions of the workpiece into engagement with and for removal by a driven multi-point cutting tool, moving around an axis of rotation of means for supporting the cutting tool, of a machine tool, comprising:
   a support frame fixed relative to the machine tool, adjacent the multi-point cutting tool;
   a carriage slidably and pivotally attached to and extending upwardly from the support frame to a position opposite the cutting tool, the carriage being movable along and pivotable relative to the support frame about a longitudinal axis extending substantially horizontal adjacent the machine tool;
   means for traversing the carriage in opposite directions, along the longitudinal axis, relative to the support frame and the cutting tool;
   cross feed means for pivoting the carriage, relative to the support frame, about the longitudinal axis toward and away from the cutting tool;
   a work support head rotatably mounted on the carriage opposite the cutting tool for pivotal movement, relative to the carriage and the cutting tool, about a pivot axis of the work support head substantially parallel to and movable about the longitudinal axis;
   means, mounted on and pivotable with the work support head, for holding and rotating a workpiece about a normal axis substantially perpendicular to the pivot axis relative to the work support head and the cutting tool;

means, for simultaneously pivoting the work support head and the workpiece holding and rotating means together about the pivot axis relative to the carriage and the cutting tool; and programmed control means operable for actuating and deactuating in a predetermined sequence the means for traversing and pivoting the carriage along and about the longitudinal axis, the means for simultaneously pivoting the work support head and the workpiece holding means about the pivot axis, and the means for rotating the workpiece holding means about the normal axis.

2. A mechanism according to claim 1 further comprising:

means adjacent to and movable with the carriage, operable for allowing and preventing pivotal movement of the work support head relative to the carriage about the pivot axis and maintaining the workpiece holding means in a predetermined angular position relative to the cutting tool; and wherein the programmed control means further comprises:

means operable for actuating and deactuating in the predetermined sequence the means operable for allowing and preventing pivotal movement of the support head about the pivot axis.

3. A mechanism according to claim 2 further comprising:

a support shaft attached to the carriage and slidably mounted in the support frame for axial movement along the longitudinal axis.

4. A mechanism according to claim 3 wherein the carriage comprises:

an upwardly extending lever arm connected to the support shaft and having
 a lower portion with a bearing hole through which the support shaft extends, and to which the support shaft is fixed against axial movement relative to the lever arms,
 an upper portion with a bearing hole in which the work support head is pivotally mounted.

5. A mechanism according to claim 4 further comprising:

a link bar with a rear end portion pivotally connected to the lever arm to pivot about an axis substantially parallel to the longitudinal axis and extending outwardly away from the lever arm and the cutting tool to an opposite forward end portion thereof;

a cross feed bar connected to the cross feed means and pivotally connected to the forward end portion of the link bar to extend lengthwise and pivot about an axis substantially parallel to the longitudinal axis and having
 an elongated slot extending through opposite sides of the cross feed bar and elongated lengthwise of the cross feed bar;

a tie rod having
 an upper end portion with a ball joint connected to the forward end portion of the link bar a fixed center distance from the pivotal connection between the rear end portion of the link bar and the lever arm,
 an opposite end portion with a lower ball joint connected to the base frame a center distance from the longitudinal axis substantially equal to the fixed center distance between the pivotal connection and the upper ball joint, and
 the ball joints being spaced a center distance less than a center distance between the pivotal connection and the longitudinal axis;

whereby the lever arm, the support frame, the link bar, and the tie rod are pivotally connected to one another and form a four bar linkage system constantly changing the angular relationship between the link bar and a horizontal plane passing through the longitudinal axis of the support shaft and allowing the cross feed means to move the carriage together with the workpiece at a relatively constant force during the pivotal movement of the carriage about the longitudinal axis toward the cutting tool.

6. A mechanism according to claim 5 wherein the means for traversing the carriage in opposite directions along the longitudinal axis comprises:

a fluid operated traversing cylinder fixed to the support frame, a traversing piston slidably mounted in the traversing cylinder;

a traversing piston rod connected to the traversing piston and to the support shaft.

7. A mechanism according to claim 6 wherein the cross feed means for pivoting the carriage about the longitudinal axis comprises:

a pivot support, fixed relative to the machine tool and the support frame, adjacent the cutting tool, a fluid operated cross feed cylinder having one of its end portions pivotally attached to the pivot support for movement in a vertical plane about a substantially horizontal axis substantially parallel to the longitudinal axis and normal to a central axis of the cross feed cylinder, a cross feed piston slidably mounted in the cross feed cylinder, a cross feed piston rod connected to and extending from the cross feed piston through the opposite end of the cylinder, a threaded rod coupled to the cross feed piston rod and extending through the elongated slot in the cross feed bar, a hand wheel, threaded onto the threaded rod, and having a portion extending into the elongated slot, and fixed against axial movement relative to the cross feed bar, whereby the elongated slot allows the cross feed bar to traverse relative to the handwheel and the cross feed means during a traversing movement of the carriage along the longitudinal axis and rotation of the handwheel shifts the handwheel and the cross feed bar axially relative to the threaded rod, and the position of the carriage and the pivot axis of the work support head relative to the cutting tool.

8. A mechanism according to claim 7 wherein the work support head comprises:

a work support housing rotatably supported opposite the cutting tool by the lever arm and fixed against axial movement relative to the upper portion of the lever arm;

a pivotal drive shaft fixed to and extending from a side of the housing through the bearing hole in the upper portion of the lever arm;

a hollow driven shaft fixed to and extending from an opposite side of the work support housing and driven in axial alignment with the pivotal drive shaft and the pivot axis.

9. A mechanism according to claim 8 wherein the means for holding and rotating a workpiece about the normal axis relative to the work support head comprises:
a workholder drive shaft rotatably mounted in the work support housing for rotation about the normal axis, having an upper end portion extending through and beyond a side wall of the work support housing and fixed against axial movement relative to the work support housing;
a workholder drive gear fixed to and rotatable with the workholder drive shaft within the housing;
a workholder support base fixed to the upper end position for rotation with the workholder drive shaft; and
means, adapted to mate with, be fixed to, and removable from the workholder support base for locating and clamping the workpiece in a predetermined position;
a driving gear drive shaft rotatably mounted within the hollow driven shaft and having an end portion extending into the housing;
a driving gear fixed to the end portion of the driving gear drive shaft extending into the housing and in driving engagement with the workholder drive gear; and
a reversible fluid operated rotary motor attached to, rotatable with, and supported by an opposite end portion of the hollow driven shaft and having an output drive shaft coupled to rotate the driving gear drive shaft relative to the hollow driven shaft, and
clutch means, coupled to the driving gear drive shaft, the output drive shaft and to the hollow driven shaft, operable for allowing and preventing relative rotary motion between the driving gear drive shaft and the hollow driven shaft and between the workpiece holding means and the work support head.

10. A mechanism according to claim 9 wherein the means operable for allowing and preventing pivotal movement of the work support head relative to the carriage and maintaining the normal axis of the workpiece holding means in the predetermined angular position comprises:
a work positioning arm fixed to the pivotal drive shaft to extend, normal to the pivot axis, adjacent the lever arm of the carriage and having
a locating hole with an axis located a predetermined distance from the pivot axis;
a torque arm adjacent the work positioning arm having
a hole through which the pivotal drive shaft extends into and through the means for pivoting the work support head fixed to the torque arm, the torque arm being pivotable relative to and with the pivotal drive shaft about the longitudinal axis and having
a short lever arm portion extending normal to and from the pivot axis,
a hole in the short lever arm portion axially alligned with the locating hole in the work positioning arm,
a long lever arm portion extending normal to the pivot axis opposite the short lever arm portion;
a second tie rod having
an upper end portion with an upper ball joint connected to the long arm portion a fixed center distance from the pivot axis,
a lower end portion with a lower ball joint connected to the support frame a center distance from the longitudinal axis substantially equal to the fixed center distance, the ball joints being spaced a center distance substantially equal to a center distance between the longitudinal axis and the pivot axis; and
means for aligning the holes, engaging, and locking the work positioning arm to the short lever arm portion of the torque arm;
whereby the long lever arm portion of the torque arm, the lever arm, the second tie rod, and the support frame are pivotally connected together at the pivot axis, the longitudinal axis, and axes of the ball joints and provide a four bar parallel linkage system maintaining the position of torque arm the work support head and the normal axis of the workpiece holding means relative to the cutting tool during a pivotal movement of the carriage about the longitudinal axis.

11. A mechanism according to claim 10 wherein the means for simultaneously pivoting the work support head and the workpiece holding and rotating means together about the pivot axis comprises:
a reversible fluid operated rotary actuator comprising:
a body fixed to the torque arm and mounted on a portion of the pivotal drive shaft rotatable within and extending through spaced bearing holes in the body;
a gear fixed and rotatable with the pivotal drive shaft;
a rack piston slidably mounted within a cylinder bore in the body and having rack teeth in driving engagement with the gear;
whereby movement of the rack piston in opposite directions rotates the gear, the pivotal drive shaft and the work support head in opposite directions relative to the carriage and the cutting tool.

12. A mechanism according to claim 11 wherein the programmed control means comprises:
a plurality of removable cam supports fixed for movement with the pivotal drive shaft, the driving gear drive shaft, the cross feed piston rod, and the traversing piston rod;
a plurality of cams fixed in predetermined positions on the cam supports;
a plurality of limit switches fixed adjacent the cam supports for actuation by the cams;
at least one programmed step switch mechanism having
a plurality of sets of contacts programmed to open and close in a predetermined sequence,
a set of the plurality of sets of contacts connected in series with each of the limit switches to a source of power and to means for actuating each stepping switch mechanism;
whereby the actuation of a limit switch to close its contacts, and the programmed closed contacts of the step switch mechanism in series therewith closes a circuit to simultaneously actuate and advance the step switch mechanism one step of a programmed cycle of operation.

13. A mechanism according to claim 12 wherein the means for locating and clamping the workpiece comprises:
a work locating arbor fixed to the work support base and having
a central hole extending axially therethrough,
a slot extending transversely to the axis of the hole and through an upper end portion of the locating arbor, and
upper and lower camming surfaces on upper and lower portions, of the slots, on opposite sides of the central hole;
means for orienting the workpiece on the locating arbor;
a clamp actuating rod slidably mounted in the central hole of the locating arbor and extending through the workholder drive shaft to an opposite side of the work support housing;
a pair of clamps adapted to engage the camming surfaces and the workpiece, pivotally connected to the clamp actuating rod and extending in opposite directions in the slot; and
a fluid operated clamping cylinder mounted on the work support housing and having
a piston slidably mounted in the clamping cylinder,
a piston rod connected to the piston and to the clamping rod;
whereby shifting the clamp actuating rod axially in one direction causes the lower camming surfaces to retract the clamps within the slot and shifting the clamping rod in an opposite direction causes the clamps to engage the upper camming surfaces forcing the clamps outwardly into clamping engagement with the workpiece.

14. A mechanism according to claim 13 wherein the means for aligning the holes engaging, and locking the work positioning arm to the short lever arm portion comprises:
a fluid operated lock pin cylinder fixed to the body of the rotary actuator adjacent the aligned holes in the short arm portion of the torque arm;
a lock pin piston slidably mounted in the lock pin cylinder,
a lock pin piston rod attached to the lock pin piston,
a tapered lock pin fixed to an opposite end of the lock pin piston rod in axial alignment with the holes in the short arm portion and the work positioning arm;
whereby movement of the lock pin piston in opposite directions causes a corresponding movement of the lock pin into and out of the aligned holes and locking engagement with the short lever arm portion and the work positioning arm.

15. A mechanism according to claim 14 wherein the programmed control means further comprises:
a plurality of solenoid operated directional control valves connected to the traversing cylinder, the cross feed cylinder, the rotary actuator, the rotary motor, the lock pin cylinder, the clamping cylinder, and the clutch means, each solenoid connected in series with a set of programmed contacts of the programmed stepping switch mechanism to the source of power,
whereby closing of the contacts in the predetermined sequence actuates the solenoids and the fluid flow control valves directing fluid under pressure to actuate the traversing cylinder, the cross feed clyinder, the rotary actuator, the rotary motor, the lock pin clyinder, the clamping cylinder, and the clutch means in the predetermined sequence.

16. A mechanism according to claim 15 wherein the programmed control means further comprises:
at least a second programmed stepping switch mechanism having
a set of programmed contacts connected in series with each of the limit switches and in parallel with each set of the programmed contacts of the first mentioned stepping switch mechanism connected in series with each of the limit switches; and
a set of programmed contacts connected in series with each of the solenoids and in parallel with each set of the programmed contacts of the first mentioned stepping switch mechanism connected in series with each of the solenoids;
whereby a larger number of programmed contacts and steps are provided than might be available in the first stepping switch mechanism to produce an additional number of movements necessary to finish the workpiece.

17. A mechanism according to claim 16 wherein the programmed control means further comprises:
means, including a pair of normally open manually operated switches each of which is connected in series with a set of a pair of alternately opened and closed programmed contacts of the step switch mechanism and to the programmed contacts connected in series with the solenoids, for manually actuating the solenoids one at a time in the predetermined programmed sequence, deactuating the solenoids, and manually controlling programmed movements of the mechanism;
whereby the normally open switches must be alternately operated and held closed to maintain one of the solenoids energized to complete one of the programmed movements, and until one of the cams actuates one of the limit switches, the step switch mechanism one step opening the closed set of the pair of alternately opened and closed programmed contacts deenergizing the one solenoid and stepping the one movement and closing the opened set of the pair of alternately opened and closed programmed contacts in series with the other one of the pair of normally open switches, and the other one of the pair of normally open switches must be actuated and held closed to start and complete another one of the movements of the programmed movements.

18. A mechanism according to claim 17 wherein the programmed control means further comprises:
a third stepping switch mechanism connected in parallel stepping and actuated simultaneously with the first mentioned stopping switch and having
a plurality of programmed contacts programmed to open and close in the predetermined sequence, and
a set of the programmed contacts connected in series with each of the solenoids connected in series to the source of power;
whereby the first and third stepping switch mechanisms are actuated simultaneously, the solenoids are separated from the first stepping switch and connected to and solely under the control of the individually programmed third stepping switch mechanism.

19. A mechanism according to claim 18 wherein the programmed control means further comprises:
- a fourth stepping switch mechanism connected in parallel with and actuated simultaneously with the second mentioned stepping switch mechanism and having
  - a set of programmed contacts connected in series with each of the solenoids and in parallel with each set of the programmed contacts of the third mentioned stepping switch mentioned connected in series with the solenoids;
- whereby an additional number of programmable contacts and steps are available in the first and second stepping switches for connection to the limit switches, an additional number of programmed contacts and steps are available in the second and fourth stepping switches for connection to the solenoids, and the solenoids are separated from the first and second stepping switches mechanisms and connected solely to and under the control of the third and fourth stepping switches.

20. A mechanism according to claim 19 further comprising:
- a second upwardly extending lever arm on the carriage spaced from and connected to the first mentioned lever arm and to the support shaft and having
  - a lower portion with a bearing hole through which the support shaft extends and to which the support shaft is fixed against axial movement relative to the lever arm,
  - an upper portion with a bearing hole in which the hollow driven shaft of the work support head is pivotally mounted with the work support housing situated between the upper portions of the lever arms; and
- a second link bar with a rear end portion pivotally connected to the second lever arm for relative movement about an axis aligned with the axis of pivotal connection between the first mentioned link bar and lever arm and extending outwardly away from the second lever arm and the cutting tool substantially parallel to the first mentioned link bar to a second opposite forward end portion connected to the upper ball joint of the tie rod and the first mentioned forward end portion, the second forward end portion being pivotally connected to an opposite end of the cross feed bar for movement about an axis aligned with the axis of the pivotal connection between the first mentioned link bar and the cross feed bar.

21. A mechanism for holding a workpiece, sequentially positioning, and feeding unwanted portion of the workpiece into engagement with and for removal by a driven multi-point cutting tool, moving around an axis of rotation of means for supporting the cutting tool, of a machine tool, comprising:
- a support frame fixed relative to the machine tool, adjacent the multi-point cutting tool;
- carriage means slidably attached to and extending upwardly from the support frame to a position opposite the cutting tool, the carriage means being movable relative to the support frame along a longitudinal axis extending substantially horizontal adjacent the machine tool and toward and away from the cutting tool;
- means for traversing the carriage means in opposite directions, along the longitudinal axis, relative to the support frame and the cutting tool;
- cross feed means for moving the carriage means, relative to the support frame, toward and away from the cutting tool;
- a work support head rotatably mounted on the carriage means opposite the cutting tool for pivotal movement, relative to the carriage means and the cutting tool, about a pivot axis of the work support head including
  - a work support housing and
  - a hollow shaft fixed to and extending from a side of the work support housing, rotatably supported by the carriage means and driven about the pivot axis;
- means, mounted on and pivotable with the work support head about the pivot axis, for holding and rotating a workpiece about a normal axis substantially perpendicular to the pivot axis relative to the work support head and the cutting tool including
  - a workholder drive shaft rotatably mounted in the work support housing for rotation about the normal axis
  - a workholder, fixed to the workholder drive shaft, for locating and clamping the workpiece in a predetermined position
  - a shaft mounted within the hollow shaft for rotation about the pivot axis, and
  - reversible drive means, connected to and for simultaneously rotating the shaft within the hollow shaft about the pivot axis relative to the hollow shaft and the workholder drive shaft about the normal axis;
- means, for simultaneously pivoting the work support head and the workpiece holding and rotating means together about the pivot axis relative to the carriage means and the cutting tool; and
- programmed control means operable for actuating and deactuating in a predetermined sequence the means for traversing the carriage means along the longitudinal axis, the cross feed means for moving the carriage means toward and away from the cutting tool, the means for simultaneously pivoting the work support head and the workpiece holding means about the pivot axis, and the means for rotating the workpiece holding means about the normal axis.

22. A mechanism according to claim 21 further comprising:
- means adjacent to and movable with the carriage means, operable for allowing and preventing pivotal movement of the work support head relative to the carriage means about the pivot axis and maintaining the workpiece holding means in a predetermined angular position relative to the cutting tool; and wherein the programmed control means further comprises:
- means operable for actuating and deactuating in the predetermined sequence the means operable for allowing and preventing pivotal movement of the support head about the pivot axis.

* * * * *

UNITED STATES PATENT OFFICE
CERTIFICATE OF CORRECTION

Patent No. 3,797,173        Dated March 19, 1974

Inventor(s) George H. Pettee and Edward R. Blake

It is certified that error appears in the above-identified patent and that said Letters Patent are hereby corrected as shown below:

Column 5, line 63; "tapere" should read - tapered -

Column 5, line 65; "tooth" should read - teeth - at both occurances

Column 7, line 22; "tooth" should read - teeth -

Column 7, line 43; "axial" should read - axis -

Column 10, line 48; "cabiet" should read - cabinet -

Column 20, line 1; "Stopping" should read - Stepping-

Column 21, line 9; "stopping" should read - stepping -

Column 21, line 53; "stop" should read - step -

Column 22, line 10; "stopping" should read - stepping -

Column 22, line 17; "stop" should read - step -

Column 22, line 20; "Stopping" should read - Stepping -

Column 22, line 25; "stopping" should read - stepping -

Column 22, line 38; "stopping" should read - stepping -

Column 22, line 58: "stop" should read - step -

Column 23, line 5; "stopping" should read - stepping -

Column 23, line 21; "stop-" should read - step- -

UNITED STATES PATENT OFFICE
CERTIFICATE OF CORRECTION

Patent No. 3,797,173  Dated  March 19, 1974

Inventor(s)  George H. Pettee and Edward R. Blake

It is certified that error appears in the above-identified patent and that said Letters Patent are hereby corrected as shown below:

Column 23, line 34;  "stop-" should read - step- -

Column 23, line 37;  "stopping" should read - stepping -

Column 23, line 46;  "stopping" should read - stepping -

Column 23, line 53;  "stop" should read - step -

Column 24, line 18;  "stopping" should read - stepping -

Column 24, line 23;  "stopping" should read - stepping -

Column 30, line 40;  after "mechanism" insert - advances -

Column 30, line 55:  "stopping" should read - stepping -

Signed and Sealed this eighteenth Day of May 1976

[SEAL]

Attest:

RUTH C. MASON
Attesting Officer

C. MARSHALL DANN
Commissioner of Patents and Trademarks